(12) United States Patent
Park et al.

(10) Patent No.: US 12,192,930 B2
(45) Date of Patent: *Jan. 7, 2025

(54) METHOD AND APPARATUS FOR TRANSMITING AND RECEIVING SYNCHRONIZATION SIGNAL IN NEW RADIO VEHICLE TO EVERYTHING SYSTEM

(71) Applicant: Innovative Technology Lab Co., Ltd., Seoul (KR)

(72) Inventors: Dong Hyun Park, Seoul (KR); Sung Jun Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,529

(22) Filed: Feb. 14, 2024

(65) Prior Publication Data

US 2024/0188009 A1    Jun. 6, 2024

Related U.S. Application Data

(63) Continuation of application No. 17/172,604, filed on Feb. 10, 2021, now Pat. No. 11,937,194, which is a (Continued)

(30) Foreign Application Priority Data

Aug. 17, 2018 (KR) .......................... 10-2018-0096338

(51) Int. Cl.
*H04W 4/40* (2018.01)
*G01S 19/05* (2010.01)
(Continued)

(52) U.S. Cl.
CPC .......... *H04W 56/001* (2013.01); *G01S 19/05* (2013.01); *H04L 27/26025* (2021.01);
(Continued)

(58) Field of Classification Search
None
See application file for complete search history.

(56) References Cited

U.S. PATENT DOCUMENTS

| 10,986,681 B2 | 4/2021 | Yoon |
| 2017/0289935 A1 | 10/2017 | Yoon |

(Continued)

FOREIGN PATENT DOCUMENTS

| CN | 102356574 A | 2/2012 |
| CN | 107852728 A | 3/2018 |

OTHER PUBLICATIONS

International Search Report for International Patent Application No. PCT/KR2019/010411, dated Dec. 12, 2019.
(Continued)

*Primary Examiner* — Srinivasa R Reddivalam

(57) ABSTRACT

One or more synchronization procedures in wireless communications are provided. A wireless user device may determine a global navigation satellite system (GNSS) as a synchronization reference source associated with a sidelink synchronization. The wireless user device may determine, based on the GNSS being the synchronization reference source associated with a sidelink synchronization and a subcarrier spacing index for sidelink, a slot number for sidelink communication. The wireless user device may transmit, based on the slot number, a sidelink synchronization signal from the wireless user device to a second wireless user device.

18 Claims, 14 Drawing Sheets

Related U.S. Application Data continuation of application No. PCT/KR2019/010411, filed on Aug. 16, 2019.

(51) Int. Cl.

| | | |
|---|---|---|
| *H04L 27/26* | (2006.01) | |
| *H04W 56/00* | (2009.01) | |
| *H04W 72/02* | (2009.01) | |
| *H04W 72/0446* | (2023.01) | |
| *H04W 92/18* | (2009.01) | |

(52) U.S. Cl.
CPC ............. *H04W 4/40* (2018.02); *H04W 72/02* (2013.01); *H04W 72/0446* (2013.01); *H04W 92/18* (2013.01)

(56) References Cited

U.S. PATENT DOCUMENTS

| | | |
|---|---|---|
| 2018/0124808 A1 | 5/2018 | Yang et al. |
| 2018/0139714 A1 | 5/2018 | Li et al. |
| 2018/0234977 A1 | 8/2018 | Yasukawa et al. |
| 2021/0153146 A1 | 5/2021 | Liu et al. |
| 2021/0168574 A1 | 6/2021 | Zhang et al. |

OTHER PUBLICATIONS

Written Opinion for International Patent Application No. PCT/KR2019/010411, dated Dec. 12, 2019.
"3rd Generation Partnership Project; Technical Specification Group Radio Access Network; NR; Radio Resource Control (RRC) protocol specification (Release 15)", 3GPP TS 38.331 V15.2.1, Jun. 2018, pp. 1-245, 3GPP Organizational Partners.
InterDigital Inc., "On V2X Synchronization in NR", R1-1809095, 3GPP TSG RAN WG1 Meeting #94, Gothenburg, Sweden, Aug. 20-24, 2018, pp. 1-3.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.1.0, Mar. 2018, pp. 1-341.
ZTE, Sanechips, "Synchronization in sidelink CA", R1-1719655, 3GPP TSG RAN WG1 Meeting #91, Reno, USA, Nov. 27-Dec. 1, 2017, pp. 1-4.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.2, Jun. 2018, pp. 1-791, 3GPP Organizational Partners.
Extended European Search Report for European Patent Application No. 19 849 619.2.

METHOD AND APPARATUS FOR TRANSMITTING AND RECEIVING SYNCHRONIZATION SIGNAL IN NEW RADIO VEHICLE TO EVERYTHING SYSTEM

CROSS-REFERENCE TO RELATED APPLICATIONS

This application is a continuation of U.S. application Ser. No. 17/172,604, filed on Feb. 10, 2021, which is a continuation of pending PCT International Patent Application No. PCT/KR2019/010411, filed on Aug. 16, 2019, which claims priority from and the benefit of Korean Patent Application No. 10-2018-0096338, filed on Aug. 17, 2018, each of which is hereby incorporated by reference in its entirety.

BACKGROUND

Technical Field

The disclosure relates to a method of transmitting or receiving a synchronization signal and a synchronization procedure for a new radio (NR) vehicle to everything (V2X) system.

Discussion of the Background

The IMT (International Mobile Telecommunication) frameworks and standards have been developed by ITU (International Telecommunication Union) and, recently, the 5th generation (5G) communication has been discussed through a program called "IMT for 2020 and beyond"

In order to satisfy requirements from "IMT for 2020 and beyond", the discussion is in progress about a way for enabling the 3rd Generation Partnership Project (3GPP) New Radio (NR) system to support various numerologies by taking into consideration various scenarios, various service requirements, potential system compatibility.

In addition, V2X communication is a communication scheme that communicates with road infrastructures and other vehicles, and exchanges or shares information such as traffic condition or the like, while driving a vehicle. V2X may include vehicle-to-vehicle (V2V) that is long-term evolution (LTE)-based communication between vehicles, vehicle-to-pedestrian (V2P) that is LTE-based communication between a vehicle and a terminal carried by a person, and vehicle-to-infrastructure/network (V2I/N) that is LTE-based communication between a vehicle and a roadside unit (RSU)/network. Here, the RSU may be a transportation infrastructure entity implemented by a base station or a fixed terminal. For example, it may be an entity that transmits a speed notification to a vehicle.

SUMMARY

An aspect of the disclosure is to provide a method of performing a synchronization procedure in an NR V2X system.

Another aspect of the disclosure is to provide a method in which an NR V2X sidelink (SL) user equipment (UE) obtains direct frame number (DFN) information.

Another aspect of the disclosure is to provide a method in which an NR V2X SL UE derives a DFN based on a synchronization reference source.

Another aspect of the disclosure is to provide a method in which an NR V2X SL UE determines an NR V2X slot number based on a synchronization reference source.

Another aspect of the disclosure is to provide a UE and a base station that perform a synchronization procedure in an NR V2X system.

Another aspect of the disclosure is to provide a UE that obtains DFN information.

Another aspect of the disclosure is to provide a base station that acts as a synchronization reference source and transfers synchronization information to a UE.

Another aspect of the disclosure is to provide a UE that derives a DFN based on information obtained from a synchronization reference source.

Another aspect of the disclosure is to provide a UE that determines an NR V2X slot number based on information obtained from a synchronization reference source.

In accordance with an aspect of the disclosure, there is provided a method of performing a synchronization procedure by a user equipment (UE) in an NR V2X system. In this instance, the method may include: receiving, by the UE, synchronization information from a synchronization reference source; and obtaining an NR V2X direct frame number (DFN) and an NR V2X slot number based on the received synchronization information. In this instance, the NR V2X DFN and the NR V2X slot number are obtained differently depending on the type of synchronization reference source.

An aspect of the disclosure is to provide a method of performing a synchronization procedure in an NR V2X system.

Another aspect of the disclosure is to provide a method in which an NR V2X sidelink (SL) user equipment (UE) obtains direct frame number (DFN) information.

Another aspect of the disclosure is to provide a method in which an NR V2X SL UE derives a DFN based on a synchronization reference source.

Another aspect of the disclosure is to provide a method in which an NR V2X SL UE determines an NR V2X slot number based on a synchronization reference source.

Effects which can be acquired by the disclosure are not limited to the above described effects, and other effects that have not been mentioned may be clearly understood by those skilled in the art from the following description.

DETAILED DESCRIPTION OF THE ILLUSTRATED EMBODIMENTS

Figure 1:
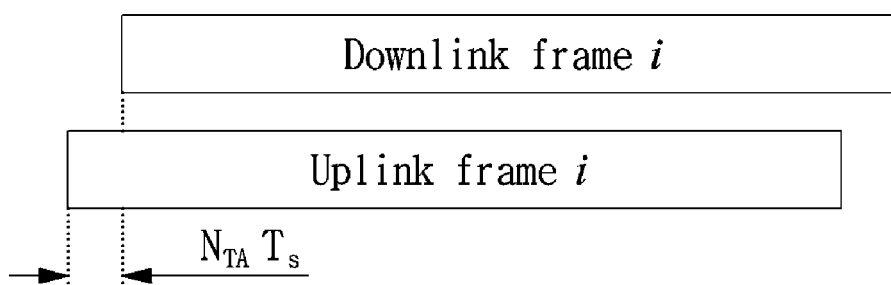
FIG. 1 is a diagram illustrating a frame structure for downlink/uplink transmission according to the disclosure.

Hereinafter, examples of the disclosure will be described in detail with reference to enclosed drawings, so that those skilled in the art could easily implement the examples. However, the disclosure could be implemented in different manners, and is not limited to the examples described below.

In describing the examples, detailed descriptions of known configurations or functions may be omitted for clarity and conciseness. In the drawings, a portion that is irrelevant to the detailed description is omitted and the like drawing reference numerals are understood to refer to the like elements, features, and structures.

In the disclosure, if an element is "linked to", "coupled to", or "connected to" another element, this expression includes an indirect connection in which another element is present between the two elements, in addition to a direct connection. In addition, if an element "includes" or "has" another element, and unless otherwise indicated, the element may not exclude another element but may further include another element.

In the disclosure, the term, "first", "second", or the like is only used for the purpose of distinguishing one element from another element, and unless otherwise stated, is not used to define the order or importance of elements. Therefore, a first element in one example may be referred to as a second element in another element, and in the same manner, a second element in one example may be referred to as a first element in another example, within the scope of the disclosure.

In the disclosure, elements are distinguished from each other for clearly describing respective features thereof, but the elements are necessarily separated. That is, a plurality of elements may be integrated to be a single piece of hardware or software, and one element may be separately implemented in plurality of pieces of hardware or software. Therefore, unless otherwise mentioned, an example in which elements are integrated or an example in which an element is separately implemented may fall within the scope of the disclosure.

In the disclosure, elements described in various examples may not be necessarily essential elements, and some of them may be optional elements. Therefore, an example that includes a subset of the elements described in an example may fall within the scope of the disclosure. In addition, an example that further includes other elements in addition to the elements described in various examples may fall within the scope of the disclosure.

Further, the specification provides descriptions in association with a wireless communication network, and tasks performed in the wireless communication network may be performed in the process in which a system (e.g., a base station) that manages the corresponding communication network controls the network and transmits data, or may be performed by a terminal that is connected to the corresponding network.

That is, it is apparent that various operations, which are performed for communicating with a terminal in a network configured with a plurality of network nodes including a base station, are executable by the base station or other network nodes other than the base station. The 'base station (BS)' may be replaced with the terms, such as, a fixed station, a Node B, an eNode B (eNB), a gNode B (gNB), an NG-eNode B (NG-eNB), an access point (AP), and the like. In addition, the 'terminal' may be replaced with the terms, such as a user equipment (UE), a mobile station (MS), a mobile subscriber station (MSS), a subscriber station (SS), a non-AP station (non-AP STA), and the like.

In the disclosure, transmission or reception of a channel refers to transmission or reception of information or a signal via the corresponding channel. For example, transmission of a control channel refers to transmission of control information of a signal via the control channel. Similarly, transmission of a data channel refers to transmission of data information or a signal via the data channel.

In the following description, a system according to various examples may be referred to as an NR system in order to distinguish the system from an existing system, but the scope of the disclosure is not limited by the term. In addition, the term, "NR system" in the specification may be used as an example of a wireless communication system that is capable of supporting various subcarrier spacings (SCSs), but the term, "NR system", is not limited to a wireless communication system that supports a plurality of SCSs.

FIG. 1 is a diagram illustrating an NR frame structure and a numerology according to an example of the disclosure.

In NR, the basic unit of the time domain may be $T_c=1/(\Delta f_{max} \cdot N_f)$ In this instance, $\Delta f_{max}=480.10^3$ and $N_f=4096$. In addition, $\kappa=T_s/T_c=64$ may be a constant of a multiple relationship between an NR time unit and an LTE time unit. As a reference time unit, $T_s=1/(\Delta f_{ref} \cdot N_{f,ref})$, $\Delta f_{ref}=15 \cdot 10^3$ Hz, and $N_{f,ref}=2048$ may be defined in LTE.

Frame Structure

Referring to FIG. 1, the time structure of a frame for downlink and uplink (DL/UL) transmission may have $T_f=(\Delta f_{max}N_f/100)$. $T_s=10$ ms. In this instance, a single frame may include ten subframes, each subframe corresponding to a time of $T_{sf}=(\Delta f_{max}N_f/1000)$. $T_s=1$ ms. The number of consecutive OFDM symbols for each subframe may be $N_{symb}^{subframe,\mu}=N_{symb}^{slot}N_{slot}^{subframe,\mu}$. In addition, each frame may be divided into two half frames, and the half frames may include subframes #0 to #4 and subframes #5 to #9, respectively. In this instance, half frame 1 may include subframes #0 to #4, and half frame 2 may include subframes #5 to #9.

In this instance, the transmission timing of uplink transmission frame i may be determined based on a downlink reception timing at a user equipment (UE) using Equation 1 provided below.

In Equation 1, $N_{TA,offset}$ may be a TA offset value caused due to a duplex mode difference or the like. Basically, in frequency division duplex (FDD), $N_{TA,offset}$ may be 0. In time division duplex (TDD), $N_{TA,offset}$ may be defined as a fixed value $N_{TA,offset}$ in consideration of a margin for a DL-UL switching time.

$$T_{TA}=(N_{TA}+N_{TA,offset})T_c \quad \text{[Equation 1]}$$

Figure 2:
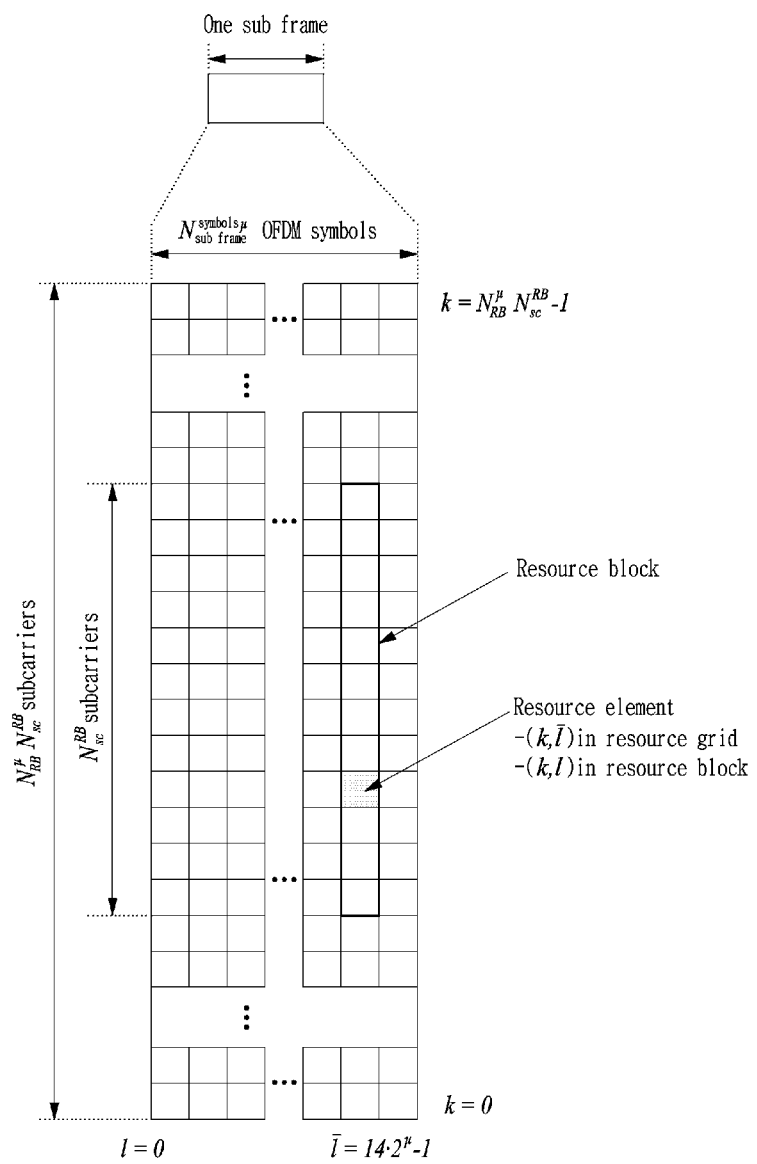
FIG. 2 is a diagram illustrating a resource grid and resource blocks according to the disclosure.

FIG. 2 is a diagram illustrating a resource grid and resource blocks.

Referring to FIG. 2, a resource element in a resource grid may be indexed based on a subcarrier spacing. In this instance, a single resource grid may be produced for each antenna port and each subcarrier spacing. Uplink and downlink transmission and reception may be performed based on a corresponding resource grid.

A single resource block may include 12 resource elements in the frequency domain, and may configure an index ($n_{PRB}$) for a single resource block for each 12 resource elements, as shown in Equation 2. An index for a resource block may be used for a predetermined frequency band or a system bandwidth.

$$n_{PRB}=\left\lfloor \frac{k}{N_{sc}^{RB}} \right\rfloor \quad \text{[Equation 2]}$$

Numerologies

Numerologies may be configured variously so as to satisfy various services and requirements of an NR system. In this instance, with reference to Table 1 below, a numerology may be defined based on a subcarrier spacing (SCS), a CP length, the number of OFDM symbols per slot, and the like used in an orthogonal frequency division multiplexing (OFDM) system. The above-mentioned values may be provided to a UE via a higher layer parameter, such as DL-BWP-mu and DL-BWP-cp (DL), and UL-BWP-mu and UL-BWP-cp(UL).

In addition, as an example, in Table 1, if μ is 2 and a subcarrier spacing is 60 kHz, a normal CP and an extended CP may be applied, and only a normal CP may be applied in other bands.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In this instance, a normal slot may be defined as a basic time unit used for transmitting a single piece of data and control information in an NR system. The length of the normal slot may include 14 OFDM symbols. In addition, a subframe, unlike a slot, may have an absolute time length corresponding to 1 ms in the NR system, and may be used as a reference time for the length of another time interval. In this instance, for coexistence or backward compatibility between the LTE system and the NR system, a time interval, such as, a subframe in LTE, may be needed for the standard of NR.

For example, in LTE, data may be transmitted based on a transmission time interval (TTI) which is a unit time, and a TTI may include one or more subframe units. In LTE, a single subframe may be set to 1 ms, and may include 14 OFDM symbols (or 12 OFDM symbols).

In NR, a non-slot may be defined. A non-slot may refer to a slot that includes symbols, the number of which is at least one smaller than that of a normal slot. For example, in the case of a service that provides a low latency, such as a ultra-reliable and low latency communications (URLLC) service, latency may be reduced using a non-slot having a smaller number of symbols than that of a normal slot. In this instance, the number of OFDM symbols included in a non-slot may be determined in consideration of the range of frequency. For example, in a frequency range greater than or equal to 6 GHZ, a non-slot having a length of 1 OFDM symbol may be considered. As another example, the number of OFDM symbols that defines a non-slot may include at least two OFDM symbols. In this instance, the scope of the number of OFDM symbols included in a non-slot may be configured based on the length of a mini slot that ranges up to "the length of a normal slot $-1$". In this instance, the range of the number of OFDM symbols may be limited to 2, 4, or 7 symbols, as the standard of a non-slot, but is not limited to the above-mentioned example.

In addition, for example, in an unlicensed band less than or equal to 6 GHz, a subcarrier spacing, corresponding to the case in which μ is 1 and 2, is used. In an unlicensed band exceeding 6 GHz, a subcarrier spacing, corresponding to the case in which μ is 3 and 4, is used. In this instance, for example, the case in which μ is 4 may be used only for a synchronization signal block (SSB), but it is not limited to the above-mentioned example.

In addition, Table 2 shows the number of OFDM symbols per μ slot ($N_{slot}^{symb,\mu}$) for each subcarrier spacing configuration in the case of a normal CP. Table 2 shows the number of OFDM symbols per slot, the number of slots per frame, and the number of slots per subframe for each subcarrier spacing value as shown in Table 1. In this instance, the above-mentioned values in Table 2 are associated with a normal slot including 14 OFDM symbols.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In addition, as described above, if μ is 2 and a subcarrier spacing is 60 kHz, an extended CP may be applied. Table 3 is the case of an extended CP, and shows corresponding values based on a normal slot of which the OFDM symbols per μ slot ($N_{slot}^{symb,\mu}$) is 12. In this instance, Table 3 shows the number of symbols per slot, the number of slots per frame, and the number of slots per subframe, in the case of an extended CP with a subcarrier spacing of 60 KHz.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Subsequently, the structure of an SS/physical broadcast channel (PBCH) block in an NR system and an initial cell access procedure in the NR system will be described.

In this instance, an NR BS (i.e., gNB) may transmit signals and channels as shown in Table 4 to UEs periodically in order to allow UEs (i.e., a UE) in a cell to perform initial cell selection.

TABLE 4

SS/PBCH block (i.e. SSB)
SIB1(System Information Block 1)
Other SIBs

For example, an SS/PBCH block may be the above-mentioned SSB. In this instance, also in the NR system, a UE needs to receive a broadcast channel, which delivers a synchronization signal and important system information transmitted from a corresponding radio access system, in order to perform initial radio access. To this end, the UE may identify the reception sensitivity of a synchronization signal in order to detect an optimal cell having the best channel environment. The UE may perform frequency/time synchronization and cell identification for initial access to an optimal channel among one or more channels within a predetermined frequency band that operates based on the identified reception sensitivity. The UE may identify the boundary of an OFDM symbol timing via the above-mentioned operation, and may start decoding a PBCH in the same SSB.

In this instance, the UE may receive a PBCH demodulation reference signal (DMRS), and may perform PBCH decoding. In addition, the UE may obtain 3-LSB bit information among an SSB index information bit, via a PBCH DMRS. Subsequently, the UE may obtain information included in a PBCH payload by performing PBCH decoding. Subsequently, the UE may perform a procedure of decoding SIB1 using the information obtained via the PBCH.

For example, in the NR system, the UE may receive remaining system information (RMSI) via a broadcast signal or channel, as system information that is not transmitted in the PBCH. In addition, the UE may receive other system information (OSI) and a paging channel via a broadcast signal or a channel, as additional other system information.

Subsequently, the UE may access a base station via a random access channel (RACH) procedure, and may perform mobility management.

In addition, for example, if the UE receives an SSB, an SSB composition and an SS burst set composition need to be configured.

NR V2X Service

In association with a V2X service, a legacy V2X service (e.g., LTE Rel-14 V2X) is capable of supporting a set of basic requirements for V2X services. In this instance, road safety services are sufficiently taken into consideration when the requirements are designed. Therefore, V2X user equipment (UEs) are capable of exchanging their state information via a sidelink, and are capable of exchanging the above-mentioned information with infrastructure nodes and/or pedestrians.

An enhanced V2X service (e.g., LTE Rel-15) adopts new features by taking into consideration the feasibility of carrier aggregation within a sidelink, high-order modulation, latency reduction, Tx diversity, and sTTI. Based on the above-mentioned description, coexistence with V2X UEs (in the same resource pool) may be required and the above-mentioned services are provided based on LTE.

For example, in consideration of use cases for supporting a new V2X service in system aspect (SA) 1, the technical features may be classified briefly based on four categories as shown in Table 5. In this instance, in Table 5, "vehicles platooning" may be technology in which a plurality of vehicles dynamically forms a group and operates in a similar way. In addition, "extended sensors" may be technology of collecting or exchanging data obtained from a sensor or video image. In addition, "advanced driving" may be technology in which a vehicle performs full-automation-based driving or semi-automation-based driving. In addition, "remote driving" may be technology that provides technologies and applications for remotely controlling a vehicle. Detailed descriptions thereof will be provided as shown in Table 5 below

TABLE 5

Vehicles Platooning
Vehicles Platooningenables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.
Extended Sensor
Extended Sensor enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.
Advanced Driving
Advanced Drivingenables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.
Remote Driving
Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In addition, in SAI, both LTE and NR are considered as enhanced V2X (eV2X) supporting technology for supporting the new V2X service. For example, an NR V2X system may be a first V2X system. In addition, an LTE V2X system may be a second V2X system. That is, the NR V2X system and the LTE V2X system may be different V2X systems. Hereinafter, related content will be described based on a method of satisfying low latency and high reliability, which are required by an NR sidelink in the NR V2X system. In this instance, the same or similar configuration may be extended and applied also to an LTE V2X system, and the disclosure is not limited to the following examples. That is, compatible features may also be applied to the LTE V2X system, and the disclosure is not limited to the following examples. In this instance, for example, NR V2X capability may not be limited to necessary supporting of only V2X services, and a V2X RaT to be used may be selectable.

Figure 3:
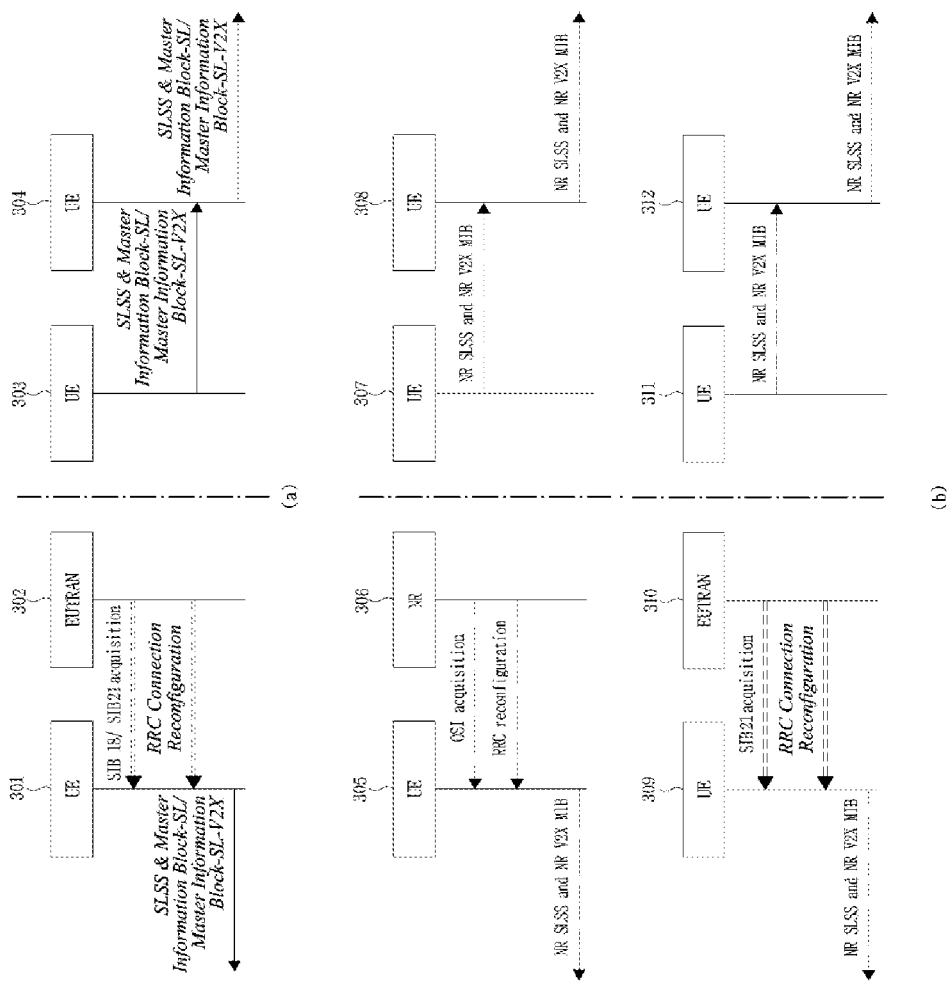
FIG. 3 is a diagram illustrating a synchronization signal transmission method according to an example of the disclosure.

FIG. 3 is a diagram illustrating a method of transmitting sidelink synchronization information.

Referring to FIG. 3, sidelink synchronization information may be transmitted. In this instance, for example, FIG. 3A illustrates a synchronization information transmission method of a first V2X system (or an LTE V2X system). In addition, FIG. 3B illustrates a synchronization information transmission method of a second V2X system (or an NR V2X system).

Referring to FIG. 3A, signaling associated with LTE sidelink synchronization information transmission for V2X in the case of in-coverage (IC) or in the case of in-partial-coverage, may be considered. Hereinafter, an example will be described based on the case of IC, and the example may be equally applied to the case of an in-partial-coverage, and the disclosure is not limited to the above-mentioned example.

In addition, signaling associated with LTE sidelink synchronization information transmission in the case of out-of-coverage (OOC) may be considered. For example, in the case of IC, a UE 301 may receive configuration information for synchronization signal transmission from a base station 302 (EUTRAN) via a system information block (SIB) 18 and/or SIB 21. For example, if a UE 303 is in an RRC connected state, configuration information for synchronization signal transmission may be transmitted via an RRC connection message. In this instance, the UE may transmit synchronization information to another UE via an SLSS & Master Information Block-SL and/or a Master Information Block-SL-V2X, based on the configuration information. Through the above, sidelink synchronization information may be transmitted.

In the case of OOC, the UE 303 includes synchronization information in the SLSS & Master Information Block-SL and/or Master Information Block-SL-V2X, and may provide the same to another UE 304, and the disclosure is not limited to the above-described example.

For example, referring to FIG. 3B, in a second V2X system (NR V2X system), in the case of IC, a UE 305 may obtain configuration information for synchronization signal transmission from a base station 306 (NR) via other system information (OSI). For example, if the UE 305 is in an RRC connected state, configuration information for synchronization signal transmission may be transmitted via an RRC connection message. In this instance, the UE 305 may include synchronization information in an NR SLSS and/or NR V2X MIB and transmit the same to another UE via a sidelink.

In the case of OOC, a UE 307 includes synchronization information in an NR SLSS and/or NR V2X MIB, and may provide the same to another UE 308, and the disclosure is not limited to the above-described example.

For example, similar to FIG. 3A, even in the second V2X system (NR V2X system), in the case of IC, a UE 309 may receive configuration information for synchronization signal transmission from a base station 310 (EUTRAN) via SIB21. For example, if the UE 309 is in an RRC connected state, configuration information for synchronization signal transmission may be transmitted via an RRC connection message. In this instance, based on the configuration information, the UE may transmit synchronization information to another UE via an NR SLSS and/or NR V2X. Through the above, sidelink synchronization information may be transmitted.

Even in the second V2X system (NR V2X system), in the case of OOC, a UE 311 includes synchronization information in an NR SLSS and/or NR V2X MIB, and provides the same to another UE 312, and the disclosure is not limited to the above-described example.

That is, in the case of IC, a V2X UE may receive pieces of information for sidelink (SL) synchronization transmission based on pieces of above-described system information, from a network based on an LTE/NRUu link (a link between an cNB or gNB and a UE). As described above, a method of transmitting synchronization information in a sidelink may include a signaling-based transmission and a UE-based transmission. In this instance, a UE may receive system configuration information for transmitting V2X-MIB and a synchronization signal (Sync signal), from an LTE BS and/or NR BS, and may perform NR SL-SSB transmission based thereon. In this instance, if the UE is connected to an LTE cell and/or NR cell in an RRC-connected mode, the system configuration information may be provided to the UE via an RRC reconfiguration message, and the UE may perform NR SL-SSB transmission based thereon.

In the case of UE-based transmission, in the case of IC, a UE may receive the information via a broadcasting signal (e.g., system information) from a base station. Alternatively, in the case of OCC, whether to transmit synchronization information may be determined based on a predetermined threshold value, and the disclosure is not limited to the above-described example.

Based on the above-mentioned description, synchronization information transmitted by a UE may be obtained based on a signal and information received from a base station in the case of IC. For example, the synchronization information transmitted by the UE may be obtained from another sidelink transmission UE. For example, the synchronization information transmitted by the UE may be derived based on a signal and information received from a GNSS.

Hereinafter, a UE that produces synchronization information by itself and transmits the synchronization information is referred to as synchronization reference UE (i.e., a SyncRef UE). That is, the UE may produce synchronization information by itself based on obtained information, and may transmit the same to another UE, which has been described above. For example, in the case of OOC, NR-SSB transmission may be performed based on SLSS and MIB information provided from the synchronization reference UE, which may be performed in order to provide advance information for transmitting synchronization information to the UE.

Hereinafter, a synchronization signal transmission method and a synchronization procedure will be described based on the above-mentioned description. For example, as an NR sidelink frequency, FR1 which is a frequency less than or equal to 6 GHz and FR2 which is a frequency greater than 6 GHz (i.e., up to 52.6 GHZ) may be considered. For example, both an unlicensed band (unlicensed ITS bands) and a licensed band may be considered as an NR sidelink frequency. As described above, a common design method for supporting each frequency band may be needed. To this end, an NR sidelink in consideration of an NR system needs to be designed. For example, although it is actually omni-directional Tx/Rx, which is the same as the design of the NR standard, as opposed to the beam-based Tx/Rx, an NR sidelink design that is capable of supporting beam-based Tx/Rx may be needed, and the disclosure is not limited to the above-mentioned description. Although Table 6 may list terms used in the disclosure, the disclosure is not limited to the above-mentioned examples.

TABLE 6

UMTS (Universal Mobile Telecommunications System):
$3^{rd}$ generation mobile communication technology based on a global system for mobile communication, which has been developed by 3GPP
EPS (Evolved Packet System):
a network system including an evolved packet core (EPC), which is an Internet protocol (IP)-based packet switched core network, and an access network such as LTE/UTRAN and the like. It is an enhanced network version of UMTS.
NodeB:
a base station of GERAN/UTRAN. It is installed outside, and the coverage area thereof corresponds to that of a macro cell.
eNodeB:
a base station of E-UTRAN. It is installed outside, and the coverage area thereof corresponds to that of a macro cell.
gNodeB:
a base station of NR. It is installed outside, and the coverage area thereof corresponds to that of a macro cell.
UE (User Equipment):

TABLE 6-continued a user equipment. A UE may also be referred to as a
"terminal", "mobile equipment", "mobile
station", and the like. In addition, the UE may be a
portable device such as a notebook, portable phone, a
personal digital assistant (PDA), a smart phone, a
muldimedia device, or the like, or may be a stationary
device such as a personal computer (PC), an in-vehicle
device, or the like. Terms such as "UE" and
"terminal" in the MTC-related content may refer
to an MTC device.
RAN (Radio Access Network):
a unit including a NodeB, an eNodeB and a gNodeB, and
a radio network controller (RNC) that controls them in
a 3GPP network. It is present between UEs, and may
provide a connection to a core network.
NG-RAN (Next Generation Radio Access Network):
NG-eNB (E-UTRA UP/CP protocol) and gNB (NR UP/CP
protocol) base station nodes connected to a 5GC
(5GC core NW) via an NG interface in the 3GPP network
Xn interface:
an interface for mutual connection between an NG-eNG
and a gNB
PLMN (Public Land Mobile Network):
a network configured for the purpose of providing a mobile
communication service to individuals. It may be configured
for each operator.
Proximity Service (or ProSe Service or Proximity based
Service):
a service that enables discovery and direct communication
between physically close devices, enables communication
via a base station, or enables communication via a third-party
device. In this instance, user plane data may be exchanged
via a direct data path, without passing a 3GPP core network
(e.g., EPC).
LTE SFN (System Frame Number):
a frame index used for making reference to the time domain of LTE
NR SFN (System Frame Number):
a frame index used for making reference to the time domain of NR
NR DFN (Direct Frame Number):
a frame index used for making reference to the time domain of an
NR sidelink

NR Sidelink Design

Hereinafter, a method of designing an NR V2X sidelink that satisfies the requirements associated with the above-mentioned enhanced V2X (i.e., eV2X) services will be described.

Particularly, a synchronization procedure and method required for establishing a radio link for an NR sidelink will be described in detail. For example, as described above, in an NR sidelink design, FR1 and FR2 (i.e., up to 52.6 GHz) and an unlicensed band and a licensed band (unlicensed ITS bands and licensed bands ITS), which are NR sidelink frequencies, may be considered as a frequency band and range in which an NR system operates. For example, the feasibility of an LTE (NG-eNG)/NRUu link which is 3GPP NG-RAN network of Table 6 may be taken into consideration for the NR sidelink design.

For example, a design for eV2X synchronization information delivery and signal transmission and reception may be considered in order to satisfy high-level requirements associated with the above-mentioned enhanced V2X services. In this instance, in order to determine a frequency for NR V2X sidelink communication, at least one of the factors shown in Table 7 may be taken into consideration based on technologies required by a new system, unlike a legacy system (e.g., LTE). That is, as NR V2X sidelink is applied based on NR radio access technologies, as shown in Table 7, particularly, uplink transmission-related technologies, new V2X service requirements need to be satisfied.

In addition to Table 7, other factors may be taken into consideration in consideration of a new system, and the disclosure is not limited to the above-described examples.

TABLE 7 configure and utilize a scalable frequency (e.g., Bandwidth Part
[BWP]) based on a broadband frequency band and the maximum
bandwidth capability of a UE
various numerologies (Numerology: e.g., Variable SCSs, Number
of OFDM symbols per a slot (or subframe))
slot format (slot/non-slot)
beam-based transmission or reception used to cope with signal
attenuation in a frequency band of 6 GHz or more which is a
high frequency band
configured grant-based uplink transmission or reception in
order to provide low latency In addition, for example, a physical channel, a signal, a basic slot structure, and a physical resource in association with an NR V2X sidelink may be as listed in Table 8 below.

TABLE 8

NR PSSCH (Physical Sidelink Shared Channel):
a physical layer NR SL data channel
NR PSCCH (Physical Sidelink Control Channel):
a physical layer NR SL control channel, which is a
channel for transferring control information in
addition to scheduling information of an NR SL
data channel
NR SLSS/PSBCH (Sidelink Synchronization Signal/Physical
Sidelink Broadcast Channel) block:
a synchronization and broadcast channel block in which an
NR SL synchronization signal and a broadcast channel are
transmitted in one continuous time in a physical layer.
In order to support beam-based transmission in an NR
frequency band, periodic transmission is performed based
on a set of one or more block indices. A synchronization
signal includes a PSSS and an SSSS. The sequence for a
corresponding signal may be produced based on at least
one SLSSID value. A PSBCH is transmitted together with
an SLSS in order to transfer system information required
for performing V2X SL communication, and may be periodically
transmitted in the form of a set of SLSS/PSBCH block indices
in order to support beam-based transmission.

Figure 4:
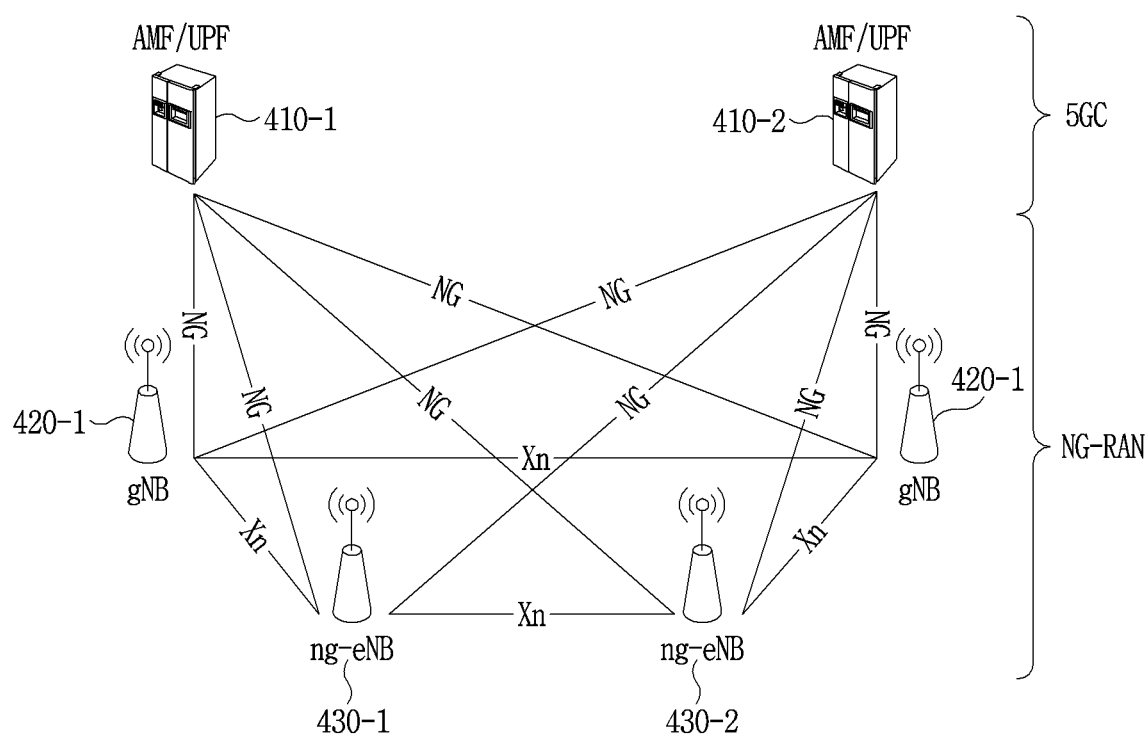
FIG. 4 is a diagram illustrating a system architecture according to an example of the disclosure.

Also, for example, FIG. 4 illustrates the configuration of a basic network architecture in consideration of an NR V2X sidelink.

For example, with reference to FIG. 4, NG interfaces may be configured between nodes 410-1 and 410-2 of 5G Core NW (5GC) and NG-RAN nodes 420-1, 420-2, 430-1, and 430-2. In addition, Xn interfaces may be configured between NG-RAN nodes 420-1, 420-2, 430-1, and 430-2. In this instance, in the architecture, the gNBs (NR UP/CP protocol) 420-1 and 420-2 and NG-eNBs (E-UTRA UP/CP protocol) 430-1 and 430-2 in the NG-RAN may be mutually connected via Xn interfaces. In addition, as described above, they are connected via NG interfaces in 5GC. For example, in the above-described architecture, both an LTE sidelink UE and an NR sidelink UE may be controlled by NG-RAN (i.e., LTE Uu and NRUu) based on a gNB and an NG-eNB. Therefore, in the case in which an NR sidelink UE transmits synchronization information, the NR sidelink UE may receive synchronization information from an LTE Uu link or NR Uu link, and may transmit NR sidelink synchronization information (e.g., SL synchronization signal/SL physical broadcast channel), and the disclosure is not limited to the above-mentioned example. That is, the NR sidelink UE is capable of obtaining synchronization information from the LTE Uu link, as well as the NR Uu link.

In association with V2X sidelink communication, V2X sidelink UEs may perform V2X sidelink communication. V2X sidelink UEs may be required to satisfy predetermined condition in order to start communication. The conditions are listed in Table 9 below. That is, a V2X sidelink UE may perform V2X sidelink communication in an RRC idle state, an inactive state, or a connected mode. In addition, V2X sidelink UEs that perform V2X sidelink communication may be required to be registered with a cell selected in a used frequency or may be required to belong to the same PLMN. In addition, if a V2X sidelink UE is OOC in a frequency for V2X sidelink communication, V2X sidelink UE may perform V2X sidelink communication only when V2X sidelink communication is operable based on pre-configuration information.

TABLE 9

A UE be in an RRC_IDLE or INACTIVE or CONNECTED mode in a predetermined cell
UEs be registered with a cell selected in a frequency used for V2X SL communication or belong to the same PLMN
V2X SL communication be operable based on pre-configuration if a UE is OOC in a frequency for V2X SL communication operation In this instance, as described above, sidelink synchronization information may be needed in order to start V2X sidelink communication. Therefore, a UE may need to transmit sidelink synchronization information. In this instance, a transmission UE (sidelink Tx UE) may receive a configuration for transmitting sidelink synchronization information before transmitting the corresponding synchronization information. In this instance, for example, the Tx UE may receive the configuration for transmitting the sidelink synchronization information based on a system information message broadcasted from the above-described NG-RAN nodes or RRC reconfiguration message (in the case of an RRC CONNECTED UE).

In addition, for example, in the case in which an NR V2X sidelink UE (hereinafter, referred to as a "UE") is not present in an NG-RAN network, the NR V2X sidelink UE may transmit sidelink synchronization information based on pre-configuration information, which has been described above.

In this instance, UEs capable of performing NR V2X sidelink communication may perform SLSS/PSBCH transmission first. For example, FIG. 5 illustrates a diagram illustrating a method of transmitting an SLSS/PSBCH by a Tx UE.

Figure 5:
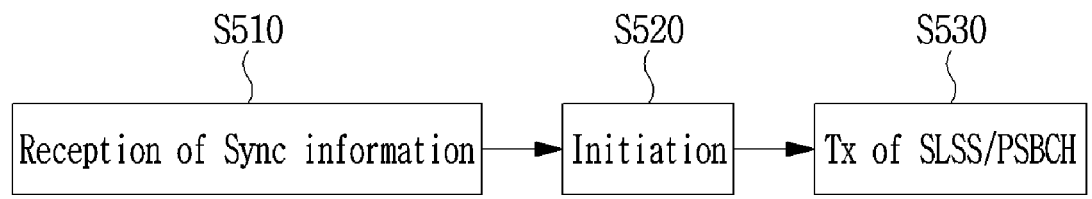
FIG. 5 is a diagram illustrating a synchronization signal transmission method according to an example of the disclosure.

Particularly, referring to FIG. 5, the Tx UE may receive a configuration for synchronization information as descried above, in operation S510. In this instance, as described above, the configuration for synchronization information may be received via system information broadcasted from NG-RAN nodes or an RRC reconfiguration message. In addition, for example, pre-configuration information may be used, which has been described above. In this instance, the UE may determine synchronization information to transmit, based on the information received from a base station or the pre-configuration information. For example, an LTE/NR base station may provide configuration information for transmitting the corresponding synchronization information to the UE via system information such as SIB21/OSI, which has been described above. In addition, if the UE does not receive the above-mentioned information, the UE may perform SLSS/PSBCH transmission based on the pre-configuration information.

Subsequently, initialization (or initiation) may be performed in operation S520. In this instance, the UE may identify whether the frequency for V2X sidelink communication is in coverage. In addition, the UE may identify whether a synchronization reference associated with a GNSS or a synchronization reference associated with a cell is selected as a synchronization reference. In addition, the UE may identify whether the UE is in a mode for controlling synchronization signal transmission in a network. In this instance, for example, whether to perform SLSS/PSBCH transmission and a transmission scheme may be determined depending on whether the UE is in the mode for controlling synchronization signal transmission in a network.

Subsequently, the Tx UE may perform SLSS/PSBCH transmission in operation S530. In this instance, the Tx UE may determine whether to perform SLSS/PSBCH transmission and a transmission scheme, based on the information determined at the initialization.

In addition, based on the above-description, the UE may determine a source for the synchronization reference. In this instance, the UE may preferentially determine a resource corresponding to a slot or time domain in which a sidelink SSID (SLSSID) and an NR sidelink synchronization signal block (NR SL SSB) are transmitted. In addition, for example, the UE may select a numerology (e.g., an SCS) to use. In this instance, for example, in the case of the above-mentioned numerology, parameters may be configured under the control of the base station. In addition, for example, a numerology may be arbitrarily determined in advance depending on a frequency used for V2X sidelink communication, and is not limited to the above-described example. In addition, for example, the UE may determine additional other information in advance, before determining a source for a synchronization reference, and the disclosure is not limited to the above-mentioned examples.

Figure 6:
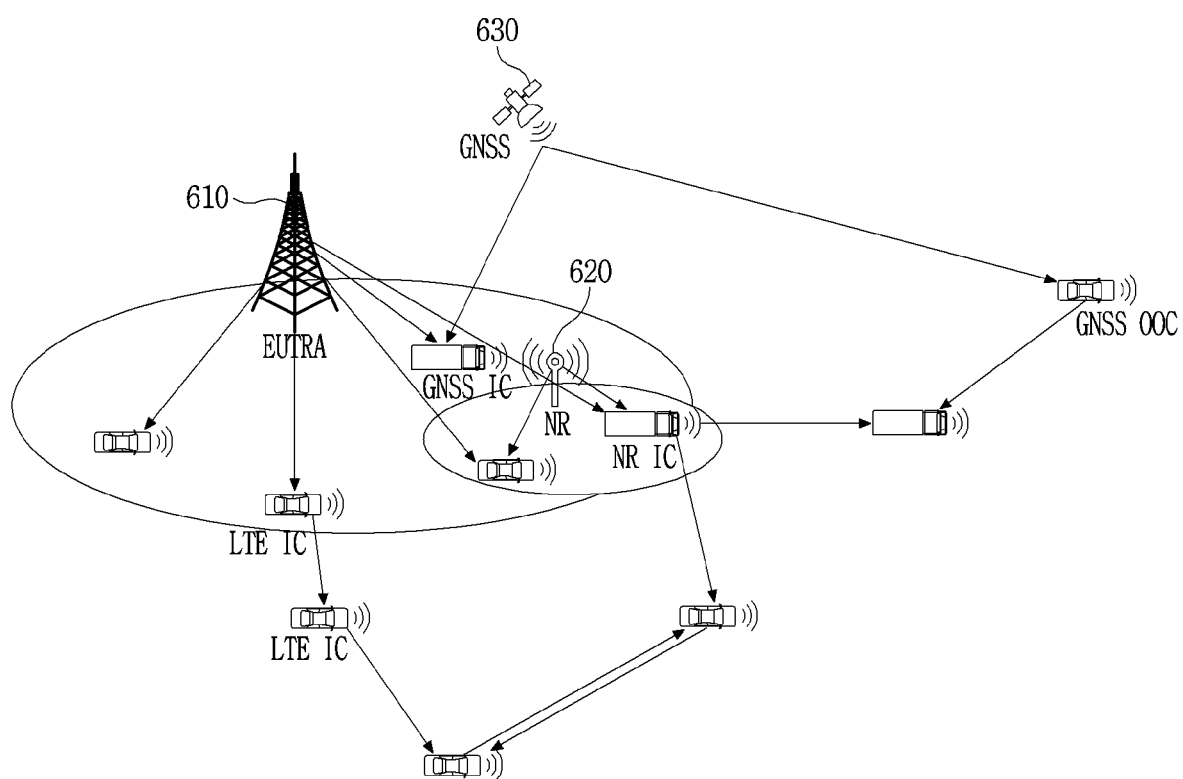
FIG. 6 is a diagram illustrating a scenario in which NR V2X sidelink communication is performed in a 3GPP network according to an example of the disclosure.

FIG. 6 is a diagram illustrating an example of a scenario in which NR V2X sidelink communication is performed in a 3GPP network based on the above descriptions. In this instance, NR V2X sidelink communication may be performed in a 3GPP network (hereinafter, NG-RAN), and additionally, the existence of a GNSS signal may be taken into consideration.

Particularly, referring to FIG. 6, each of the NR V2X sidelink UEs may be IC or OOC from the perspective of an NG-ENG 610. In addition, each UE may be IC or OOC from the perspective of a gNB 620. In addition, each UE may be IC or OOC from the perspective of a GNSS 630. In consideration of the above-described situation, each of the NR V2X sidelink UEs may select a source of a synchronization reference based on the location and capability of the corresponding UE. In addition, for example, in addition to the scenario of FIG. 6, scenarios such as Table 10 may be taken into consideration, and the disclosure is not limited to the above-described examples.

TABLE 10

NRUu CONNECTED/IDLE/Inactive for NRSidelink
NG-eNBUu CONNECTED/IDLE for NRSidelink
EN-DC or MR-DC for NRSidelink Example (NR V2X SLDFN/Slot Determination)

Hereinafter, a method of determining the DFN of an NR V2X sidelink and an NR V2X slot number will be described. In this instance, for example, a DFN may be a frame index used to make reference to the time domain of an NR V2X sidelink, as described above. In this instance, the NR V2X sidelink may be synchronized based on the DFN. The DFN (or slot) of the NR V2X sidelink may be determined based on a predetermined synchronization reference source. For example, the predetermined synchronization reference source may be at least one of an LTE Uu link, an NR Uu link, and a GNSS. In addition, for example, another synchronization reference source may be used as the predetermined synchronization source, and the disclosure is not limited to the above-described examples.

Hereinafter, a method of deriving (or determining) an NR V2X sidelink DFN (or slot) based on the above-description will be described in detail.

Hereinafter, an NR SCS may be any one of an SCS value for an NR DL SS/PBCH, an SCS value for NR BWP (data/control channel), or a reference SCS value defined/configured for comparison with an NR V2X SCS value. As another example, an NR SCS may be one of an SCS value for an NR V2X SLSS/PBCH, an SCS value for an NR V2X BWP or resource pool (data/control channel), and a reference SCS value defined/configured for comparison with an NR V2X SCS value, and the disclosure is not limited to the above-described examples.

Example 1 (a Method of Determining NR V2X SL DFN/Slot Based on an LTE Cell Timing)

Figure 7:
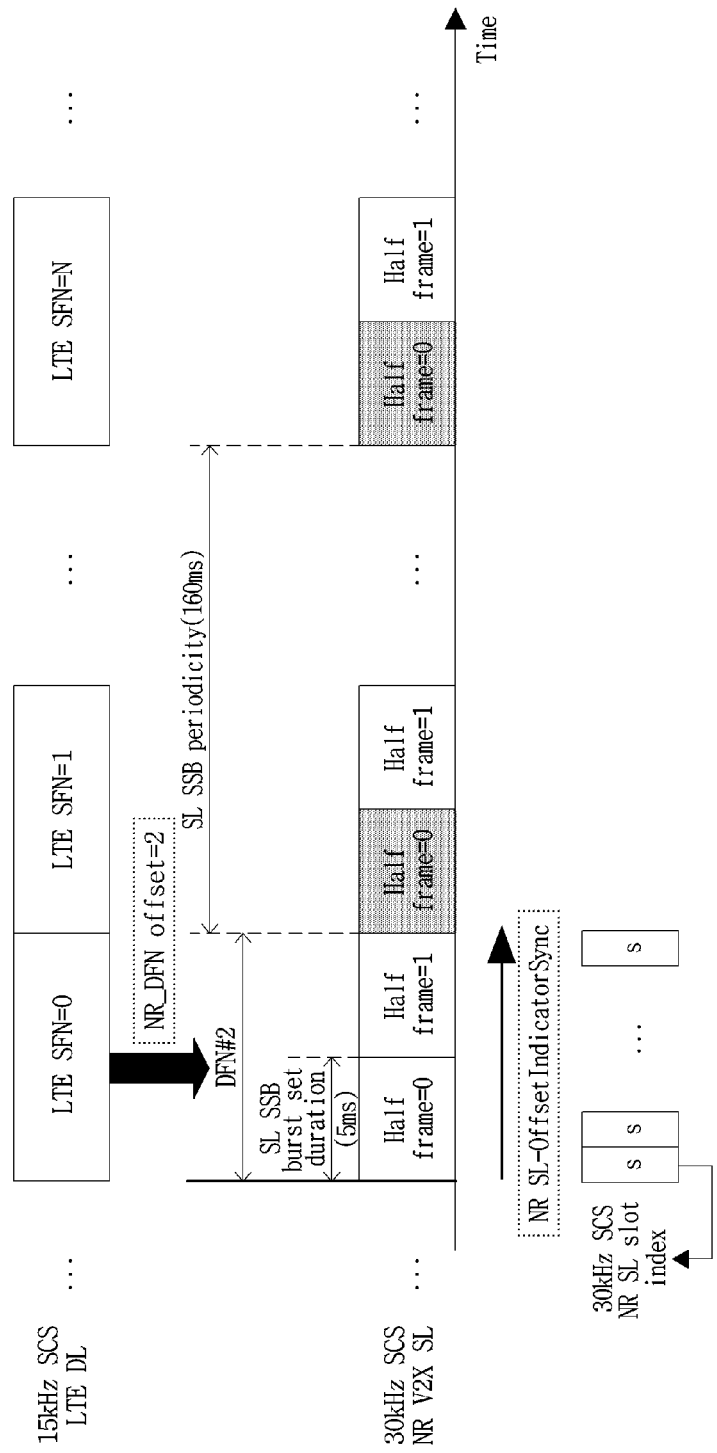
FIG. 7 is a diagram illustrating a method of directly obtaining a timing from a base station (eNB), by a V2X UE, according to an example of the disclosure.

The case in which an NR V2X UE selects a timing of an LTE cell determined as a synchronization reference source may be considered. In this instance, a DFN and an NR V2X slot value for NR V2X sidelink communication may be determined. Particularly, referring to FIG. 7, a V2X UE may directly obtain a timing from a base station (eNB). That is, the V2X UE may receive information associated with synchronization from the base station (eNB). In this instance, for example, a V2X DNF may be obtained by Equation 3 as given below.

NR V2X DFN=LTE SFN from PBCH+NR_DFNoffset [Equation 3]

Particularly, the V2X UE may detect a DL broadcast channel (physical broadcast channel (PBCH)) transmitted from an eNB cell. In this instance, for example, system information may be included in the DL broadcast channel, and "LTE SFN/subframe" information may also be included in the system information. That is, the V2X UE may receive information associated with "LTE SFN frame PBCH" of Equation 3 from the eNB cell. Also, "NR DFNoffset" may be included in the NR V2X system information message, and may be provided to the UE. That is, the NR V2X system information message may include an offset value for an NR DFN. In this instance, the above-described value may be used to indicate a DFN offset value relative to the LTE SFN. That is, the V2X UE may obtain the above-described information and may determine the NR V2X DFN value based on Equation 3. Through the above, the degrees of freedom for SFN/DFN configuration between different 3GPP networks may be provided.

In this instance, for example, the start of an NR-SL SSB burst set may be indicated by the DFN value determined as described above and an "NR SL-offsetIndicatorSyn" parameter. "NR SL-OffsetIndicatorSync" may be transmitted via system information transmitted from an NG-RAN (i.e., LTE Uu and NRUu) base station or an RRC reconfiguration message. That is, the DFN obtained based on the above-description may be used to indicate the start point of the NR-SL SSB burst set, and is not limited to the above-described examples.

In addition, for example, an NR V2X slot number, which corresponds to an LTE subframe number, may be obtained based on an SCS. Particularly, in NR, an SCS may be as shown in Table 1. In Table 1, u may be an NR V2X SL SCS (SLSS/PSBCH SCS) index. For example, if u=0, an SCS is 15 kHz. In addition, if u=1, an SCS is 30 kHz. In this instance, for example, if the value of u is increased, a time resolution may be increased, and the time length of each NR V2X slot may be decreased. In this instance, in consideration of the above-description, the correlation between an NR V2X slot number and an LTE subframe may be defined by Equation 4 provided below.

NR V2X slot number=(LTE subframe number*$2^u$), (LTE subframe number*$2^u$+1), . . . (LTE subframe number*$2^u$+$2^u$−1) [Equation 4]

Figure 8:
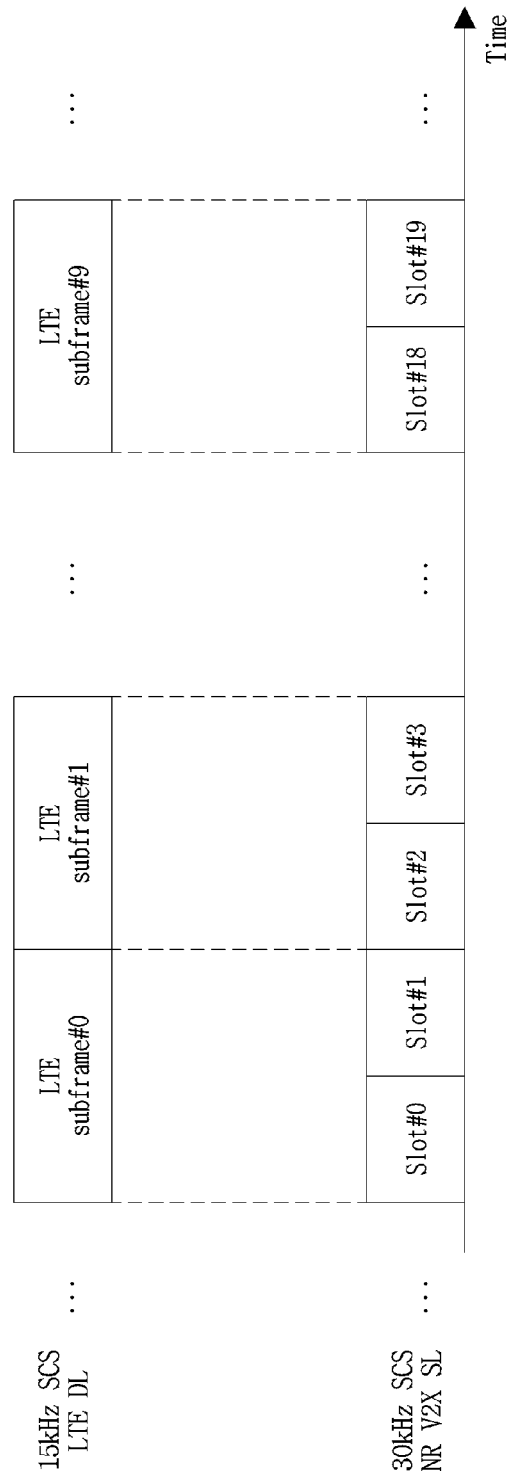
FIG. 8 is a diagram illustrating an NR V2X slot number if an SCS for an NR V2X sidelink is 30 kHz according to an example of the disclosure.

In this instance, for example, FIG. 8 illustrates the case in which u=1 (an SCS of 30 kHz) in Equation 4. In this instance, if an LTE subframe number is #0, corresponding NR V2X slot numbers may be "#0" and "#1". In this instance, if the LTE subframe number is #1, the corresponding NR V2X slot numbers may be "#2" and "#3". That is, one LTE subframe may correspond to two NR slot numbers.

As another example, the case in which u=2 (an SCS of 60 kHz) in Equation 4 may be considered. In this instance, if the LTE subframe number is "#0", corresponding NR V2X slot numbers may be "#0", "#1", "#2" and "#3". In this instance, if the LTE subframe number is "#1", corresponding NR V2X slot numbers may be "#4", "#5", "#6" and "#7". That is, one LTE subframe may correspond to four NR slot numbers. In addition, the method may be equivalently applied to another SCS, and is not limited to the above-described example. In addition, for example, if u=0 (an SCS of 15 kHz) in Equation 4, an LTE subframe number may correspond to an NR V2X slot number in a one-to-one relationship.

As another example, in the case of LTE V2X, the value of u is not configured as described above, and may indicate always an SCS of 15 kHz. That is, LTE V2X slot numbers may correspond to LTE subframe numbers in a one-to-one relationship. Accordingly, the same numbers may be used without a predetermined offset value, and the disclosure may not be limited to the above-described example.

As another example, the case of receiving synchronization information from a synchronization reference UE (SyncRef UE) having an LTE timing may be considered. In this instance, for example, as described in FIG. 3, an OOC UE may receive synchronization information from a synchronization reference UE. In this instance, the OCC UE may perform NR-SSB transmission based on SLSS and MIB information obtained from the synchronization reference UE.

That is, although the case in which the OOC UE obtains an SLSS associated with an LTE timing from a synchronization reference UE in coverage of the LTE cell may be considered, the disclosure is not limited to the above-described example. In this instance, for example, the synchronization reference UE may be in coverage, and thus, may be capable of obtaining an NR V2X DFN/NR slot number based on Equation 3 and Equation 4.

For example, information associated with the start point of an SL-SSB burst time window may be indicated by an "NR SL-OffsetIndicatorSync" parameter, which has been described above. In this instance, for example, based on the above-mentioned parameter, the start of an SL-SSB burst in an SL SSB burst set period may be indicated at intervals of 5 ms.

In this instance, the synchronization reference UE may perform SLSS/PSBCH block burst transmission based on the obtained information. In this instance, a V2X SL-MIB information field in each PSBCH may include information as listed in Table 11 provided below. That is, in the V2X SL-MIB information field, DFN information that the synchronization reference UE obtains may be included. In addition, for example, in the V2X SL-MIB information field, Hf information may be included as a half-frame index. In addition, for example, in the V2X SL-MIB information field, SLSS/PSBCH block index information may be included. In addition, for example, SCS information may be included in the V2X SL-MIB information field, and this is not limited to the above-described example.

TABLE 11

DFN
Hf
SLSS/PSBCH block index
Subcarrier spacing (SLSS/PSBCH SCS)

In this instance, the V2X UE that receives the above-mentioned information may determine an NR V2X DFN value and slot index. Particularly, the NR V2X DFN may be determined based on the DFN value included in the PSBCH. That is, the NR V2X DFN may be set to the DFN value in Table 11. In this instance, for example, the NR V2X slot number may be determined based on the half frame (Hf) value, the SCS value, and a slot index number to which the SLSS/PSBCH index value in the indicated half frame is mapped.

As another example, information associated with the start point of an SL-SSB burst time window may be indicated by an "NR SL-OffsetIndicatorSync" parameter. In this instance, based on the above-mentioned parameter, the start of an SL-SSB burst in an SL SSB burst set period may be indicated in units of slots.

In this instance, the synchronization reference UE may perform SLSS/PSBCH block burst transmission based on the obtained information. In this instance, a V2X SL-MIB information field in each PSBCH may include information as listed in Table 12 provided below. That is, in the V2X SL-MIB information field, DFN information that the synchronization reference UE obtains may be included. In addition, for example, in the V2X SL-MIB information field, "NR SL-OffsetIndicatorSync" information may be included. In this instance, "NR SL-OffsetIndicatorSync" information is a slot offset value of the DFN, and may be used to indicate, to the UE, the start of an SLSS/PSBCH burst or an SLSS/PSBCH block, which has been described above.

TABLE 12

DFN
NR SL-OffsetIndicatorSync

In this instance, the V2X UE that receives the above-mentioned information may determine an NR V2X DFN value and an NR V2X slot index. Particularly, the NR V2X DEN may be determined based on the DFN value included in the PSBCH. That is, the NR V2X DEN may be set to the DFN value in Table 12. In this instance, for example, the NR V2X slot number may be obtained based on a slot index value indicated by the "NR SL-OffsetIndicatorSync" value, and is not limited to the above-mentioned example.

Figure 9:
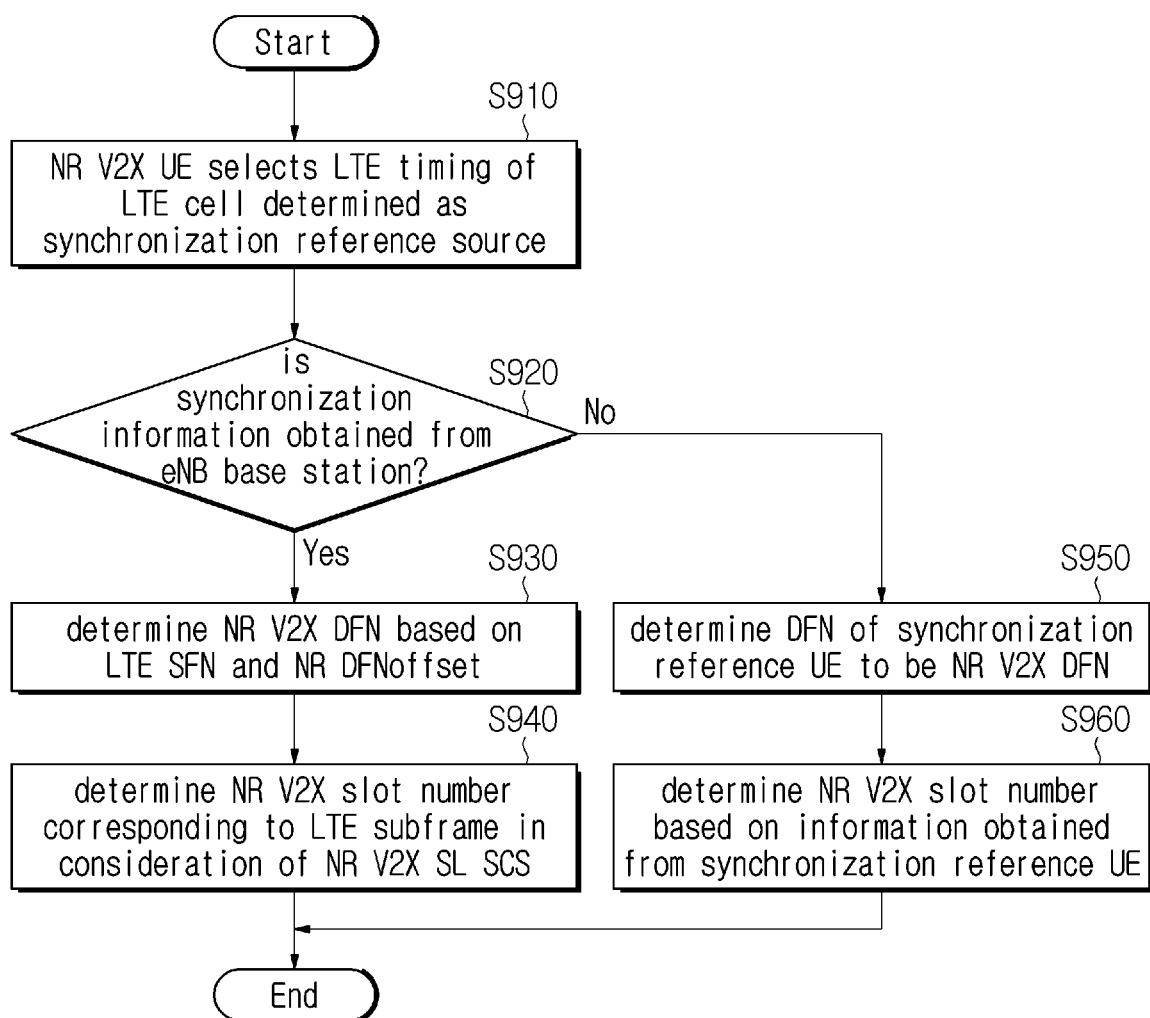
FIG. 9 is a diagram illustrating a method of determining an NR V2X DFN and an NR V2X slot number based on an LTE cell timing according to an example of the disclosure.

FIG. 9 is a diagram illustrating a method of determining an NR V2X DFN and an NR V2X slot number based on an LTE cell timing.

Referring to FIG. 9, an NR V2X UE may select an LTE timing of LTE cell determined as a synchronization reference source in operation S910. That is, as described above, the NR V2X UE may determine an NR V2X DFN and an NR V2X slot number, based on an LTE timing. In this instance, the case in which the NR V2X UE obtains synchronization information from an eNB may be considered in operation S920. For example, if the NR V2X UE is in coverage, the NR V2X UE may directly receive synchronization information from the CNB. In this instance, the NR V2X UE may obtain an LTE SNF and an LTE subframe value based on information included in a PBCH broadcasted from the eNB. The NR V2X UE may determine the NR V2X DFN using the obtained LTE SFN and the obtained information in operation S930, which has been described above. In addition, the NR V2X slot number may be determined based on the LTE subframe in consideration of the size of an NR V2X SL SCS, which has been described above.

In addition, for example, the case in which the NR V2X UE does not obtain synchronization information from the eNB may be considered. That is, the NR V2X UE is an OOC UE, and may receive synchronization information from a synchronization reference UE. In this instance, for example, the synchronization reference UE may perform SLSS/PSBCH block burst transmission, may include synchronization information, such as a DFN value and the like, in a V2X SL-MIB information field in the PSBCH, and may transmit the same, which has been described above. In this instance, for example, in operation S950, the NR V2X UE may determine the DFN value received from the synchronization reference UE to be the NR V2X DFN, which has been described above. In addition, for example, in operation S960, the NR V2X UE may obtain synchronization information from the synchronization reference UE, and may determine the NR V2X slot number based on the synchronization information, which has been described above.

Example 2 (a Method of Determining NR V2X SL DFN/Slot Based on an NR Cell Timing)

Figure 10:
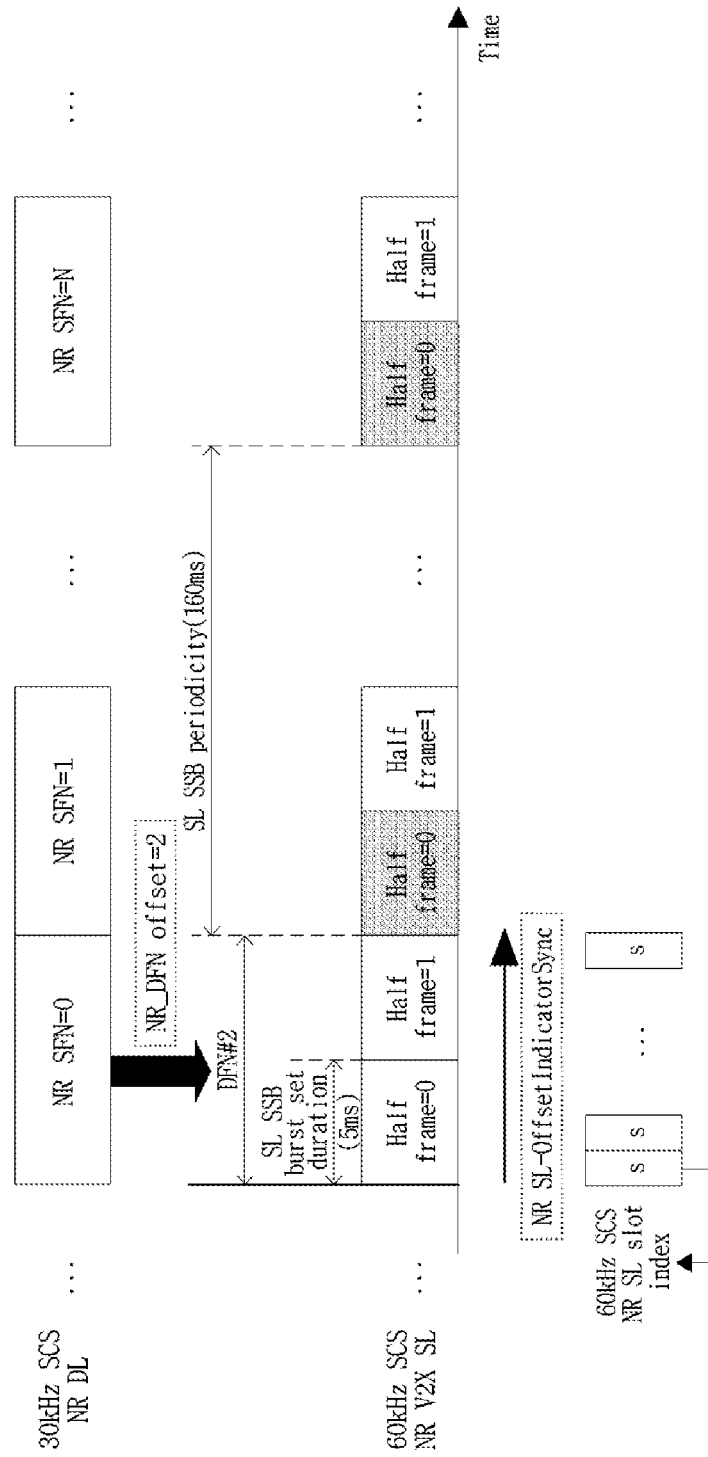
FIG. 10 is a diagram illustrating a method of directly obtaining a timing from a base station (gNB), by a V2X UE, according to an example of the disclosure.

The case in which an NR V2X UE selects a timing of an NR cell determined as a synchronization reference source, may be considered. In this instance, a DEN and a slot value for NR V2X sidelink communication may be determined. Particularly, referring to FIG. 10, a V2X UE may directly obtain a timing from a base station (gNB). In this instance, for example, a V2X DNF may be obtained by Equation 5 or Equation 6 as given below.

$$\text{NR V2X DFN} = \text{NR SFN from PBCH} + \text{NR\_DFNoffset} \quad \text{[Equation 5]}$$

$$\text{NR V2X DFN} = \text{NR SFN from PBCH} \quad \text{[Equation 6]}$$

Particularly, the V2X UE may detect a DL broadcast channel (physical broadcast channel (PBCH)) transmitted from a gNB cell. In this instance, for example, in the DL broadcast channel, system information may be included and "NR SFN/slot" information may be included. That is, the V2X UE may receive "NR SFN frame PBCH" of Equation 5 from the gNB cell. In addition, "NR DFNoffset" may be included in the NR V2X system information message, and may be provided to the UE. That is, the NR V2X system information message may include an offset value for an NR DFN. In this instance, the above-described value may be used to indicate a DFN offset value relative to the NR SFN. That is, the V2X UE may obtain the above-described information and may obtain an NR V2X DFN value. Through the above, the degrees of freedom for SFN/DFN configuration between different 3GPP networks may be provided.

As another example, the NR V2X DFN may be considered to be the same as the NR SFN, as shown in Equation 6. Particularly, since they are operated in the same NR network, a separate offset may not be needed. In addition, physical channel/signal transmission in an NR Uu link and multiplexing with an NR V2X signal may be allowed. Therefore, in consideration the above-description, it is allowed that the value that is the same as the NR SFN may be applied as the NR V2X DFN.

In addition, for example, the start of an NR-SL SSB burst set may be indicated by the DEN value obtained as described above and an "NR SL-offsetIndicatorSyn" parameter. "NR SL-OffsetIndicatorSync" may be transmitted via system information or an RRC reconfiguration message transmitted from an NG-RAN (i.e., LTE Uu and NRUu) base station. That is, the DEN obtained based on the above-description may be used to indicate the start point of the NR-SL SSB burst set, and is not limited to the above-described examples.

In addition, for example, an NR V2X slot number associated with NR slot numbers may be determined. Particularly, In NR, an SCS may be as shown in Table 1. In this instance, the case in which an SCS value for an NR V2X sidelink is greater than or equal to an NR SCS value may be considered. For example, the SCS value for the NR V2X sidelink may be always greater than or equal to the NR SCS value in the above described case, and the disclosure is not limited to the above-described example. In this instance, for example, an NR V2X slot number may be obtained by Equation 7.

NR V2X slot number=(NR slot number×$2^{u_{v2x}-u_{nr}}$),
(NR slot number×$2^{u_{v2x}-u_{nr}}$+1), . . . (NR slot
number×$2^{u_{v2x}-u_{nr}}$+$2^{u_{v2x}-u_{nr}}$−1) [Equation 7]

Figure 11:
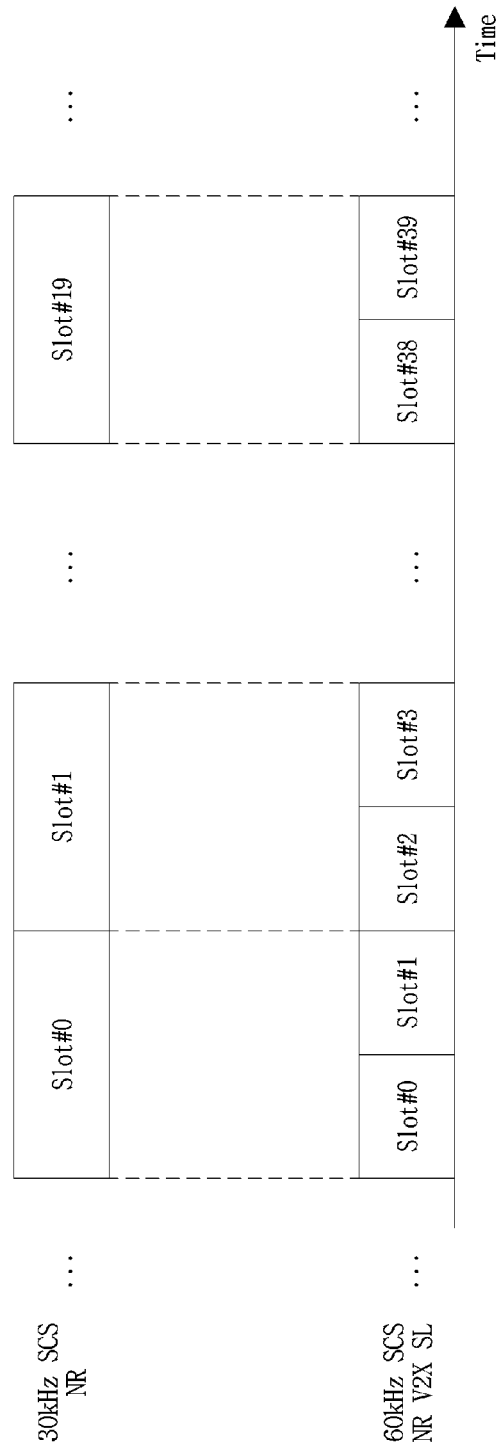
FIG. 11 is a diagram illustrating an NR V2X slot defined based on an SCS of 60 kHz and an NR slot defined based on an SCS of 30 kHz according to an example of the disclosure.

That is, based on the difference between an SCS value that defines an NR V2X slot and an NR SCS, NR V2X slot numbers that correspond to an NR slot number may be determined. For example, referring to FIG. 11, an NR V2X slot defined based on an SCS of 60 kHz and an NR slot defined based on an SCS of 30 kHz may be considered. In this instance, two 60 kHz-NR V2X slots (u=2) may correspond to a single 30 kHz-NR slot number (u=1), based on Equation 7. As another example, in the case of NR V2X slots (u=3) defined based on an SCS of 120 kHz, four NR V2X slots may correspond to a single NR slot number based on an SCS of 30 KHz.

In this instance, Equation 7, $u_{nr}$ denotes an index corresponding to an NR SCS. $u_{v2x}$ denotes an index corresponding to an NR V2X SL SCS (SLSS/PSBCH SCS). Each value is listed in Table 3 provided above.

As another example, as described above, a configuration in which an SCS value for an NR V2X sidelink is always greater than or equal to an NR SCS value may not be applied.

That is, the case in which the SCS value for the NR V2X sidelink is less than or equal to the NR SCS value may be considered. In this instance, an NR V2X slot number may be determined based on Equation 8 provided below.

NR V2X slot number=(NR slot number×$2^{u_1-u_2}$),(NR
slot number×$2^{u_1-u_2}$+1), . . . (NR slot number×
$2^{u_1-u_2}$+$2^{u_1-u_2}$−1) [Equation 8]

In this instance, for example, $u_1$ may be a higher SCS index value between the NR SCS and the SCS for an NR V2X sidelink. In addition, $u_2$ may be a smaller SCS index value between the NR SCS and the SCS for an NR V2X sidelink.

Figure 12:
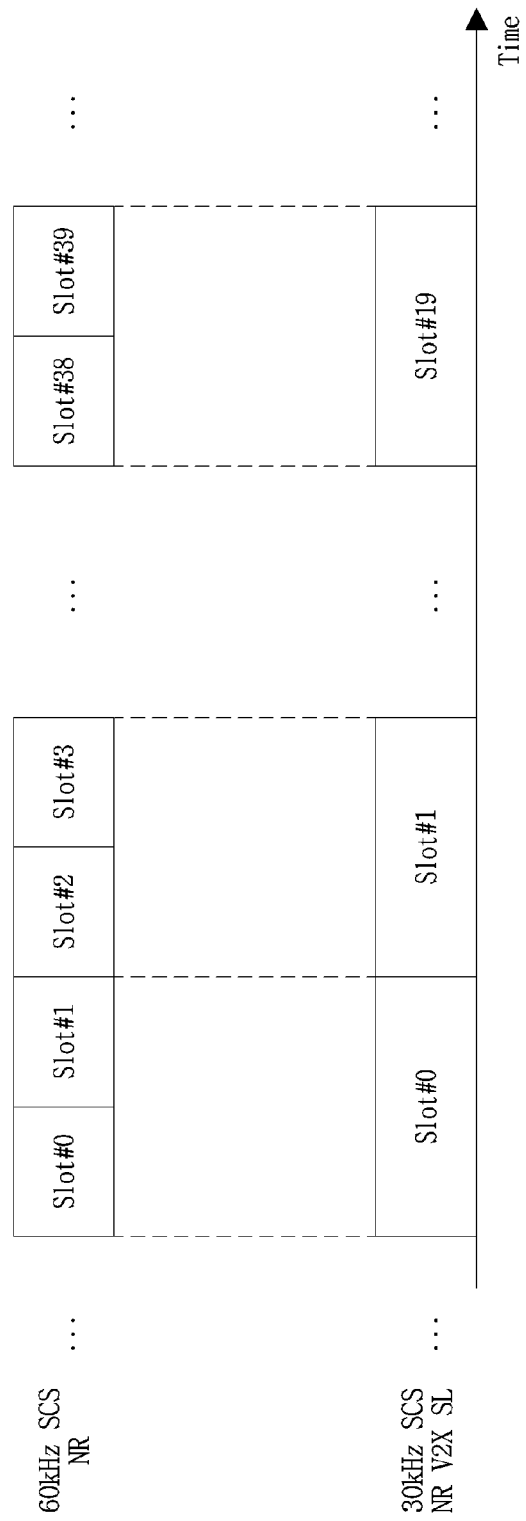
FIG. 12 is a diagram illustrating an NR V2X slot number if an SCS for NR is 60 kHz and an SCS for an NR V2X sidelink is 30 kHz according to an example of the disclosure.

As described above, if the SCS value for the NR V2X sidelink is less than or equal to the NR SCS value, a plurality of NR slot numbers may correspond to a single NR V2X slot number. Particularly, if an SCS of NR is 30 kHz and an SCS for an NR V2X sidelink is 15 kHz, two NR slots may correspond to a single NR V2X slot. For example, NR slot #0 and NR slot #1 may correspond to NR V2X slot #0. In addition, FIG. 12 illustrates the case in which an NR SCS is 60 kHz and an SCS for an NR V2X sidelink is 30 kHz. In this instance, referring to FIG. 12, if an SCS of NR is 60 kHz and an SCS for an NR V2X sidelink is 30 kHz, two NR slots may correspond to a single NR V2X slot. In this instance, the SCS value for the NR V2X sidelink is less than or equal to the NR SCS value, the relationship between the NR slot number and the NR V2X slot number may be defined by Equation 9. That is, based on Equation 9, a plurality of NR slots may correspond to a single NR V2X slot, and the disclosure is not limited to the above-described example.

NR slot number=(NR V2X slot number×$2^{u_{nr}-u_{v2x}}$),
(NR V2X slot number×$2^{u_{nr}-u_{v2x}}$+1), . . . (NR
V2X slot number×$2^{u_{nr}-u_{v2x}}$+$2^{u_{nr}-u_{v2x}}$−1)

As another example, the case of receiving synchronization information from a synchronization reference UE (SyncRef UE) having an NR timing may be considered. In this instance, for example, as described in FIG. 3, an OOC UE may receive synchronization information from a synchronization reference UE. In this instance, the OCC UE may perform NR-SSB transmission based on SLSS and MIB information obtained from the synchronization reference UE.

That is, although the case in which the OOC UE obtains an SLSS associated with an NR timing from a synchronization reference UE in coverage of the NR cell may be considered, the disclosure is not limited to the above-described example. In this instance, for example, the synchronization reference UE may be in coverage, and thus, may be capable of obtaining an NR V2X DFN/NR slot number value based on Equation 5 to Equation 9.

For example, information associated with the start point of an SL-SSB burst time window may be indicated by an "NR SL-OffsetIndicatorSync" parameter, which has been described above. In this instance, for example, based on the above-mentioned parameter, the start of an SL-SSB burst in an SL SSB burst set period may be indicated at intervals of 5 ms.

In this instance, the synchronization reference UE may perform SLSS/PSBCH block burst transmission based on the obtained information. In this instance, a V2X SL-MIB information field in each PSBCH may include information as listed in Table 13 provided below. That is, in the V2X SL-MIB information field, DFN information that the synchronization reference UE obtains may be included. Also, for example, in the V2X SL-MIB information field, Hf information may be included as a half-frame index. In addition, for example, in the V2X SL-MIB information field, SLSS/PSBCH block index information may be included. In addition, for example, SCS information may be included in the V2X SL-MIB information field, and the disclosure is not limited to the above-described example.

TABLE 13

DFN
Hf
SLSS/PSBCH block index
Subcarrier spacing (SLSS/PSBCH SCS)

In this instance, the V2X UE that receives the above-mentioned information may determine an NR V2X DFN value and a slot index. Particularly, the NR V2X DFN may be determined based on the DFN value included in the PSBCH. That is, the NR V2X DFN may be set to the DFN value in Table 13. In this instance, for example, the NR V2X slot number may be determined based on the Hf value, the SCS value, and the slot index number to which the SLSS/PSBCH index value is mapped in the indicated half frame.

As another example, information associated with the start point of an SL-SSB burst time window may be indicated by an "NR SL-OffsetIndicatorSync" parameter. In this instance, based on the above-mentioned parameter, the start of an SL-SSB burst in an SL SSB burst set period may be indicated in units of slots.

In this instance, the synchronization reference UE may perform SLSS/PSBCH block burst transmission based on the obtained information. In this instance, a V2X SL-MIB information field in each PSBCH may include information as listed in Table 14 provided below. That is, in the V2X SL-MIB information field, DFN information that the synchronization reference UE obtains may be included. In addition, for example, in the V2X SL-MIB information field, "NR SL-OffsetIndicatorSync" information may be included. In this instance, the "NR SL-OffsetIndicatorSync" information is a slot offset value of the DEN and may be used to indicate, to the UE, the start an SLSS/PSBCH burst or an SLSS/PSBCH block, which has been described above.

TABLE 14

DFN
NR SL-OffsetIndicatorSync

In this instance, the V2X UE that receives the above-mentioned information may determine an NR V2X DFN value and a slot index. Particularly, the NR V2X DFN may be determined based on the DFN value included in the PSBCH. That is, the NR V2X DFN may be set to the DFN value in Table 14. In this instance, for example, the NR V2X slot number may be obtained based on a slot index value indicated by the "NR SL-OffsetIndicatorSync" value, and the disclosure is not limited to the above-mentioned example.

Figure 13:
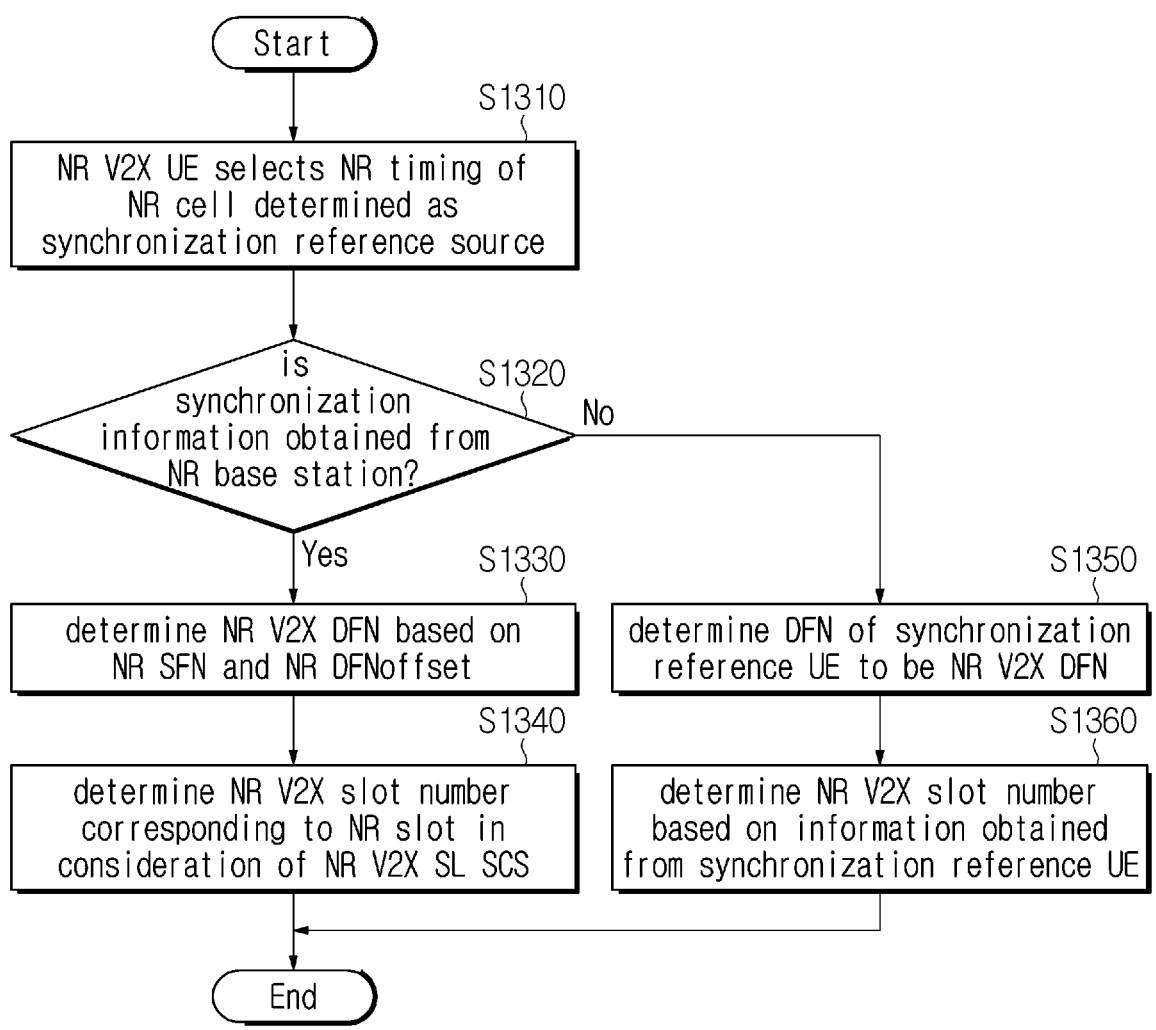
FIG. 13 is a diagram illustrating a method of determining an NR V2X DFN and an NR V2X slot number based on an NR cell timing according to an example of the disclosure.

Referring to FIG. 13, an NR V2X UE may select a timing of an NR cell determined as a synchronization reference source. That is, as described above, the NR V2X UE may determine an NR V2X DFN based on an NR timing, and may determine an NR V2X slot number. In this instance, in operation S1320, the case in which the NR V2X UE obtains synchronization information from a gNB base station may be considered. For example, if the NR V2X UE is in coverage, the NR V2X UE may directly receive synchronization information from the gNB base station. In this instance, the NR V2X UE may obtain an NR SNF and an NR subframe value based on information included in a PBCH broadcasted from the gNB base station. In this instance, the NR V2X UE may determine the NR V2X DFN using the obtained NR SFN and the obtained information, which has been described above. In addition, the NR V2X slot number may be determined based on an NR slot in consideration of the size of an NR V2X SL SCS, which has been described above.

In addition, for example, the case in which the NR V2X UE does not obtain synchronization information from the gNB base station may be considered. That is, the NR V2X UE is an OOC UE, and may receive synchronization information from a synchronization reference UE. In this instance, for example, the synchronization reference UE may perform SLSS/PSBCH block burst transmission, may include synchronization information, such as a DEN value and the like, in a V2X SL-MIB information field in a PSBCH, and may transmit the same, which has been described above. In this instance, for example, in operation S1350, the NR V2X UE may determine the DFN value received from the synchronization reference UE to be the NR V2X DFN, which has been described above. In addition, for example, in operation S1360, the NR V2X UE may obtain synchronization information from the synchronization reference UE, and may determine the NR V2X slot number based on the synchronization information, which has been described above.

Example 3 (a Method of Determining NR V2X SL DFN/Slot Based on an NG-RAN Timing)

The case in which an NR V2X UE selects an NG-RAN timing of an NG-RAN determined as a synchronization reference source may be considered. In this instance, for example, an NG-RAN timing may be referred to as a timing of which a source integrates a source for an NR timing and a source for an LTE timing. In this instance, for example, reception of an SLSSID value having an NG-RAN timing may mean that a UE receives one or more SLSS signals having an LTE cell timing or an NR cell timing.

That is, an NR-RAN timing may refer an integrated timing of an NR timing and an LTE timing. In this instance, a DFN and a slot value for NR V2X sidelink communication may be determined. Particularly, the V2X UE may detect a DL broadcast channel (physical broadcast channel (PBCH)) from an LTE cell or an NR cell based on the above-described Example 1 and Example 2. In this instance, information for determining an NR DEN may be included in the PBCH. For example, if the PBCH is received from the LTE cell, operation may be performed according to Example 1. In addition, for example, if the PBCH is received from the NR cell, operation may be performed according to Example 2, and the disclosure is not limited to the above-described example.

In addition, for example, the start of an NR-SL SSB burst set may be indicated by a DEN value obtained as described above and an "NR SL-offsetIndicatorSyn" parameter. "NR SL-OffsetIndicatorSync" may be transmitted via system information or an RRC reconfiguration message transmitted from an NG-RAN (i.e., LTE Uu and NR Uu) base station. That is, the DEN obtained based on the above-description may be used to indicate the start point of the NR-SL SSB burst set, and the disclosure is not limited to the above-described examples.

In addition, for example, an NR V2X slot number associated with NR slot numbers may be determined. In this instance, if the NR V2X slot number is determined based on the LTE cell, operation may be performed according to Example 1. In addition, for example, if the NR V2X slot number is determined based on the NR cell, operation may be performed according to Example 2, and the disclosure is not limited to the above-described example.

As another example, the case of receiving synchronization information from a synchronization reference UE (SyncRef UE) having an NG-RAN timing may be considered. In this instance, for example, as described in FIG. 3, an OOC UE may receive synchronization information from a synchronization reference UE. That is, the case in which the OOC UE obtains an SLSS associated with an NG-RAN timing from a synchronization reference UE in coverage of the NG-RAN cell, may be considered. In this instance, for example, if the synchronization information is received from the synchronization reference UE based on the LTE cell, operation may be performed according to Example 1. In addition, for example, if the synchronization information is received from the synchronization reference UE based on the NR cell, operation may be performed according to Example 2, and the disclosure is not limited to the above-described example.

Example 4 (a Method of Determining NR V2X SL DFN/Slot Based on a GNSS Timing)

As another example, the case in which an NR V2X UE selects a GNSS as a synchronization reference source may be considered. In this instance, a DFN, a half frame, and/or slot value for NR V2X sidelink communication may be determined.

Particularly, information associated with the start point of an SL-SSB burst time window may be indicated by an "NR SL-OffsetIndicatorSync" parameter. In this instance, based on the above-mentioned parameter, the start of an SL-SSB burst in an SL SSB burst set period may be indicated at intervals of 5 ms (half frame). In this instance, a DFN, a half frame number, and a slot number may be as shown in Equations 10 to 12.

$$DFN=Floor(0.1*(Tcurrent-Tref-offsetDFN)) \bmod 1024 \quad \text{[Equation 10]}$$

$$Half\ Number=Floor(Tcurrent-Tref-offsetDFN) \bmod 2 \quad \text{[Equation 11]}$$

$$SlotNumber=Floor((Tcurrent-Tref-offsetDFN)*2^u) \bmod(10*2^u)$$

As another example, information associated with the start point of an SL-SSB burst time window may be indicated by the "NR SL-OffsetIndicatorSync" parameter. In this instance, based on the above-mentioned parameter, the start of an SL-SSB burst in an SL SSB burst set period may be indicated in units of slots. In this instance, for example, a DFN and a slot number may be as shown in Equation 13 and Equation 14 provided below.

$$DFN=Floor(0.1*(Tcurrent-Tref-offsetDFN)) \bmod 1024 \quad \text{[Equation 13]}$$

$$SlotNumber=Floor((Tcurrent-Tref-offsetDFN)*2^u) \bmod(10*2^u) \quad \text{[Equation 14]}$$

In this instance, for example, Tcurrent is the current UTC time value obtained form the GNSS. In this instance, the UTC time value may be expressed as milliseconds. In addition, Tref may be a reference UTC time value for a UTC time value. In addition, in Equations 10 to 14, OffsetDFN may be a DFN offset value relative to an NR V2X SL DEN value. In this instance, OffsetDFN may be expressed in units of "milliseconds". In this instance, the above-described value may be obtained based on a GNSS timing. For example, if a configuration for an offset value is not present, the offset value may be regarded as "0". In this instance, the above-described value may be expressed as milliseconds. For example, if "Tcurrent−Tref−offsetDFN=2.2 ms" in Equation 14, which is a time that is taken into consideration of the GNSS reception time and DFNoffset value, and the SCS value of an NR V2X slot is u=1 (an SCS of 30 kHz), an NR V2X slot number corresponding to 2.2 ms may be 4 ("Floor(2. 2*2) mod 20=4") based on Equation 14.

Figure 14:
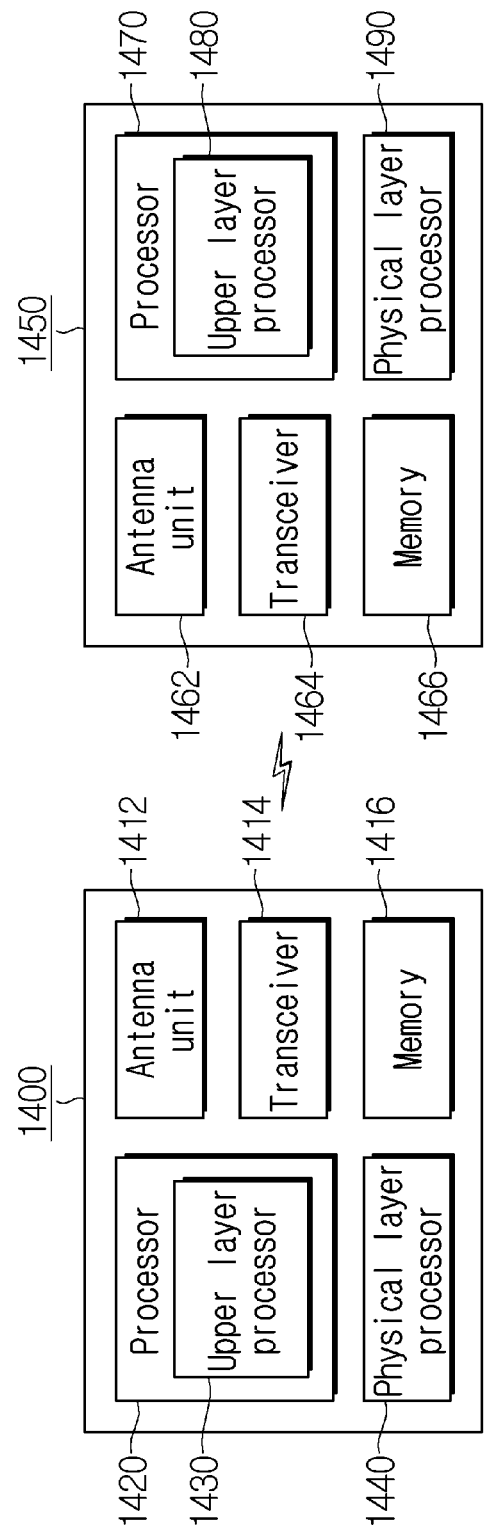
FIG. 14 is a diagram illustrating the configuration of a base station device and a UE device according to an example.

As another example, if "Tcurrent−Tref−offsetDFN=2.2 ms" and u=2 (an SCS of 60 kHz), an NR V2X slot number corresponding to 2.2 ms may be 8("Floor(2. 2*4) mod 20=8") based on Equation 14. That is, after "Tcurrent−Tref−offsetDEN" is obtained based on the GNSS, an NR V2X slot number may be determined in consideration of an SCS based on Equation 14. However, the disclosure is not limited to the above-described examples. FIG. 14 is a diagram illustrating the configuration of a base station device and a terminal device according to the disclosure.

The base station device 1400 may include a processor 1420, an antenna unit 1412, a transceiver 1414, and a memory 1416.

The processor 1420 processes signals related to a baseband, and may include a higher layer processor 1430 and a physical layer processor 1440. The higher layer processor 1430 may process the operations of a medium access control (MAC) layer, a radio resource control (RRC) layer, or a higher layer thereof. The physical layer processor 1120 may process the operations of a physical (PHY) layer (e.g., processing an uplink transmission signal or processing a downlink reception signal). The processor 1420 may control the overall operation of the base station device 1400, in addition to processing signals related to a baseband.

The antenna unit 1412 may include one or more physical antennas, and may support multiple input multiple output (MIMO) transmission/reception when the antenna unit 1412 includes a plurality of antennas. The transceiver 1414 may include a radio frequency (RF) transmitter and an RF receiver. The memory 1416 may store information processed by the processor 1420, and software, an OS, applications or the like associated with the operations of the base station device 1400, and may include elements, such as a buffer or the like.

The processor 1420 of the base station 1400 may be configured to implement operations of a base station described in the examples of the disclosure.

The terminal device 1450 may include a processor 1470, an antenna unit 1462, a transceiver 1464, and a memory 1466.

The processor 1470 processes signals related to a baseband, and may include a higher layer processor 1480 and a physical layer processor 1462. The higher layer processor 1480 may process the operations of an MAC layer, an RRC layer, or a higher layer thereof. The physical layer processor 1490 may process the operations of a PHY layer (e.g., processing a downlink reception signal or processing an uplink transmission signal). The processor 1470 may control the overall operation of the terminal device 1450, in addition to processing signals related to a baseband.

The antenna unit 1462 may include one or more physical antennas, and may support MIMO transmission/reception when the antenna unit 1462 includes a plurality of antennas. The transceiver 1464 may include an RF transmitter and an RF receiver. The memory 1466 may store information processed by the processor 1470, and software, an operating system, applications or the like associated with the operations of the terminal device 1450, and may include elements, such as a buffer or the like.

The processor 1470 of the terminal device 1450 may be configured to implement operations of a terminal described in the examples of the disclosure.

Descriptions provided with reference to the examples of the disclosure may be equally applied to the base device 1400 and the terminal device 1450, and repetitious descriptions will be omitted.

Although the above described illustrative methods are expressed as a series of operations for case of description, they may not limit the order of operations performed, and the operations may be performed in parallel or in a different order. In order to implement a method according to the disclosure, another operation may be additionally included to the described operations, some operations may be excluded and the remaining operations may be performed, or some operations may be excluded and other operations may be additionally added.

In addition, for example, the terminal device 1450 may be an NR V2X sidelink UE which has been described above. In this instance, for example, the terminal device 1450 may derive (or determine) a DFN of an NR V2X sidelink and an NR V2X slot number according to the above-mentioned examples. For example, the NR V2X sidelink DFN (or slot) may be determined based on a predetermined synchronization reference source. More particularly, the terminal device 1450 may derive (or determine) a DFN and V2X slot number based on an LTE timing as described in Example 1. For example, the terminal device 1450 may derive (or determine) a DFN and V2X slot number based on an NR timing as described in Example 2. As another example, the terminal device 1450 may derive (or determine) a DFN and V2X slot number based on an NG-RAN timing as described in Example 3. The terminal device 1450 may derive (or determine) a DFN and V2X slot number based on a GNSS as described in Example 4. In this instance, the processor 1470 of the terminal device 1450 may perform operations to implement Examples 1 to 3. In this instance, the processor 1470 of the terminal device 1450 may use at least one of an antenna unit 1462, a transceiver 1464, and a memory 1466 when performing operations to implement Example 1 to Example 3, and the disclosure is not limited to the described examples.

The base station device 1400 may be at least one of an eNB base station and a qNB base station, which have been described above. In this instance, as an eNB base station, the base station device 1400 may provide information associated with an LTE timing to the terminal device 1450 according to Example 1. In this instance, the terminal device 1450 may derive (or determine) a DFN and V2X slot number based on the information received from the base station device 1400 as described in the example. In addition, for example, as a gNB base station, the base station 1400 may provide information associated with an NR timing to the terminal device 1450 according to Example 2. In this instance, the terminal device 1450 may derive (or determine) a DFN and V2X slot number based on the information received from the base station device 1400 as described in the example. In addition, for example, as an NG-RAN, the base station 1400 may provide information associated with an LTE timing or an NR timing to the terminal device 1450 according to Example 3. In this instance, the terminal device 1450 may derive (or determine) a DFN and V2X slot number based on the information received from the base station device 1400. In this instance, the processor 1420 of the base station device 1400 may perform operations to implement Examples 1 to 3. The processor 1420 of the base station 1400 may use at least one of the antenna unit 112, the transceiver 1414, and the memory 1416, in order to implement the above-mentioned operations, and the disclosure is not limited to the above-described examples.

The various examples of the present disclosure are not an exhaustive list of all possible combinations and are intended to describe representative aspects of the present disclosure, and the matters described in the various examples may be applied independently or in combination of two or more.

In addition, various examples of the present disclosure may be implemented by hardware, firmware, software, or a combination thereof. For hardware implementations, one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), General Purpose It may be implemented by a general processor, a controller, a microcontroller, a microprocessor, and the like.

It is intended that the scope of the disclosure include software or machine-executable instructions (eg, an operating system, an application, firmware, a program, etc.) to cause an operation in accordance with various examples of the method to be executed on an apparatus or a computer, and such software or Instructions, and the like, including non-transitory computer-readable media that are stored and executable on a device or computer.

What is claimed is:

1. A wireless user device comprising:
   at least one antenna;
   at least one processor; and
   a memory storing instructions that, when executed by the at least one processor, cause the wireless user device to:
   determine a global navigation satellite system (GNSS) as a synchronization reference source associated with a sidelink synchronization;
   determine a slot number for sidelink communication, based on:
   the GNSS being the synchronization reference source associated with a sidelink synchronization;
   a subcarrier spacing index for sidelink; and
   one or more time parameters associated with the GNSS, wherein the determining the slot number is based on Floor((Tcurrent−Tref−OffsetDFN)*$2^\mu$)mod(10*$2^\mu$),
   where Tcurrent is a current Coordinated Universal Time (UTC) time obtained from the GNSS, Tref is a reference UTC time, OffsetDFN is, if configured, a direct frame number (DFN) offset value associated with a sidelink DFN or, if not configured, zero, and, wherein $\mu$ is the subcarrier spacing index for sidelink; and
   transmit, based on the slot number, a sidelink synchronization signal from the wireless user device to a second wireless user device.

2. The wireless user device of claim 1, wherein the instructions, when executed by the at least one processor, cause the wireless user device to:
   determine, based on the one or more time parameters associated with the GNSS and based on the GNSS being the synchronization reference source associated with a sidelink synchronization, a direct frame number (DFN) of a frame,
   wherein the transmitting the sidelink synchronization signal is further based on the DFN.

3. The wireless user device of claim 1, wherein:
   $\mu=0$ for 15 kHz of subcarrier spacing for sidelink;
   $\mu=1$ for 30 kHz of subcarrier spacing for sidelink;
   $\mu=2$ for 60 kHz of subcarrier spacing for sidelink;
   $\mu=3$ for 120 kHz of subcarrier spacing for sidelink; and
   $\mu=4$ for 240 kHz of subcarrier spacing for sidelink.

4. The wireless user device of claim 1, wherein the instructions, when executed by the at least one processor, cause the wireless user device to:
   determine a parameter indicating a starting point of a sidelink-synchronization signal block (SL-SSB) time window, and
   transmit the sidelink synchronization signal by transmitting, based on the slot number and based on the parameter indicating the starting point of the SL-SSB time window, one or more SL-SSBs.

5. The wireless user device of claim 4, wherein the instructions, when executed by the at least one processor, cause the wireless user device to:
receive, from a base station, one or more messages comprising the parameter indicating the starting point of the SL-SSB time window.

6. The wireless user device of claim 1, wherein the instructions, when executed by the at least one processor, cause the wireless user device to:
receive, from a base station, configuration information for transmitting one or more sidelink synchronization signal, and
transmit the sidelink synchronization signal further based on the configuration information.

7. The wireless user device of claim 1, wherein the instructions, when executed by the at least one processor, cause the wireless user device to:
determine, based on not receiving from a base station configuration information for transmitting one or more sidelink synchronization signal, preconfigured configuration information for transmitting one or more sidelink synchronization signal, and
transmit the sidelink synchronization signal further based on the preconfigured configuration information.

8. The wireless user device of claim 1, wherein the sidelink synchronization comprises a New Radio (NR) vehicle-to-everything (V2X) sidelink synchronization,
wherein the subcarrier spacing index for sidelink comprises a subcarrier spacing index for NR V2X sidelink,
wherein the slot number for sidelink communication comprises a slot number for NR V2X sidelink communication, and
wherein the sidelink synchronization signal comprises an NR V2X sidelink synchronization signal.

9. The wireless user device of claim 1, wherein the instructions, when executed by the at least one processor, cause the wireless user device to:
establish a link between the wireless user device and a base station, and
wherein the link between the wireless user device and the base station comprises at least one of:
a Long-Term Evolution (LTE) Uu link; or
a New Radio (NR) Uu link.

10. A wireless user device comprising:
at least one antenna;
at least one processor; and
a memory storing instructions that, when executed by the at least one processor, cause the wireless user device to:
determine a global navigation satellite system (GNSS) as a synchronization reference source associated with a sidelink synchronization;
determine a slot number for sidelink communication, based on:
the GNSS being the synchronization reference source associated with a sidelink synchronization; and
a modulo operation associated with a subcarrier spacing index for sidelink;
transmit, based on the slot number, a sidelink synchronization signal from the wireless user device to a second wireless user device, and wherein the instructions, when executed by the at least one processor, cause the wireless user device to determine the slot number based on Floor((Tcurrent−Tref−OffsetDFN)*$2^\mu$)mod($10*2^\mu$), where Tcurrent is a current Coordinated Universal Time (UTC) time obtained from the GNSS, Tref is a reference UTC time, OffsetDFN is, if configured, a direct frame number (DFN) offset value associated with a sidelink DEN or, if not configured, zero, and wherein $\mu$ is the subcarrier spacing index for sidelink.

11. The wireless user device of claim 10, wherein the instructions, when executed by the at least one processor, cause the wireless user device to:
determine, based on one or more time parameters associated with the GNSS and based on the GNSS being the synchronization reference source associated with a sidelink synchronization, a direct frame number (DFN) of a frame,
transmit the sidelink synchronization signal further based on the DFN, and
determine the slot number further based on the one or more time parameters associated with the GNSS.

12. The wireless user device of claim 10, wherein: $\mu=0$ for 15 kHz of subcarrier spacing for sidelink; $\mu=1$ for 30 kHz of subcarrier spacing for sidelink; $\mu=2$ for 60 kHz of subcarrier spacing for sidelink; $\mu=3$ for 120 kHz of subcarrier spacing for sidelink; and $\mu=4$ for 240 kHz of subcarrier spacing for sidelink.

13. The wireless user device of claim 10, wherein the instructions, when executed by the at least one processor, cause the wireless user device to:
determine a parameter indicating a starting point of a sidelink-synchronization signal block (SL-SSB) time window, and
transmit the sidelink synchronization signal by transmitting, based on the slot number and based on the parameter indicating the starting point of the SL-SSB time window, one or more SL-SSBs.

14. The wireless user device of claim 13, wherein the instructions, when executed by the at least one processor, cause the wireless user device to:
receive, from a base station, one or more messages comprising the parameter indicating the starting point of the SL-SSB time window.

15. The wireless user device of claim 10, wherein the instructions, when executed by the at least one processor, cause the wireless user device to:
receive, from a base station, configuration information for transmitting one or more sidelink synchronization signal, and
transmit the sidelink synchronization signal further based on the configuration information.

16. The wireless user device of claim 10, wherein the instructions, when executed by the at least one processor, cause the wireless user device to:
determine, based on not receiving from a base station configuration information for transmitting one or more sidelink synchronization signal, preconfigured configuration information for transmitting one or more sidelink synchronization signal, and
transmit the sidelink synchronization signal further based on the preconfigured configuration information.

17. The wireless user device of claim 10, wherein the sidelink synchronization comprises a New Radio (NR) vehicle-to-everything (V2X) sidelink synchronization,
wherein the subcarrier spacing index for sidelink comprises a subcarrier spacing index for NR V2X sidelink,
wherein the slot number for sidelink communication comprises a slot number for NR V2X sidelink communication, and
wherein the sidelink synchronization signal comprises an NR V2X sidelink synchronization signal.

18. The wireless user device of claim 10, wherein the instructions, when executed by the at least one processor, cause the wireless user device to:

establish a link between the wireless user device and a base station,
wherein the link between the wireless user device and the base station comprises at least one of:
a Long-Term Evolution (LTE) Uu link; or
a New Radio (NR) Uu link.

* * * * *